(12) United States Patent
Hagiwara et al.

(10) Patent No.: US 9,065,147 B2
(45) Date of Patent: Jun. 23, 2015

(54) BATTERY SYSTEM, VEHICLE, AND BATTERY-MOUNTING DEVICE

(75) Inventors: Hideki Hagiwara, Toyota (JP); Takahisa Matsuta, Okazaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 788 days.

(21) Appl. No.: 13/132,376

(22) PCT Filed: Apr. 17, 2009

(86) PCT No.: PCT/JP2009/057754
§ 371 (c)(1),
(2), (4) Date: Jun. 2, 2011

(87) PCT Pub. No.: WO2010/119566
PCT Pub. Date: Oct. 21, 2010

(65) Prior Publication Data
US 2012/0032644 A1    Feb. 9, 2012

(51) Int. Cl.
| | |
|---|---|
| *H02J 7/00* | (2006.01) |
| *H02J 7/14* | (2006.01) |
| *H01M 10/0525* | (2010.01) |
| *H01M 10/0587* | (2010.01) |
| *H01M 10/42* | (2006.01) |

(Continued)

(52) U.S. Cl.
CPC ........ *H01M 10/0525* (2013.01); *H01M 2/0217* (2013.01); *H01M 10/0587* (2013.01); *H01M 10/425* (2013.01); *H01M 10/486* (2013.01); *H01M 10/5008* (2013.01); *H01M 10/5014* (2013.01); *H01M 10/5016* (2013.01);

(Continued)

(58) Field of Classification Search
USPC ......... 320/104, 135, 136, 134, 144, 153, 132, 320/107, 150, 162; 429/11, 247, 233, 162, 429/62, 127, 129, 128, 144, 161, 209
See application file for complete search history.

(56) References Cited

U.S. PATENT DOCUMENTS 6,773,848 B1 *  8/2004  Nortoft et al. ................. 429/158
7,803,483 B2 *  9/2010  Takami et al. ................. 429/181

(Continued)

FOREIGN PATENT DOCUMENTS

| JP | 10-55825 | 2/1998 | |
| JP | 10214613 A * | 8/1998 | .............. H01M 2/34 |

(Continued)

OTHER PUBLICATIONS

International Search Report in International Application No. PCT/JP2009/057754; Mailing Date: Jul. 21, 2009.

*Primary Examiner* — Edward Tso
*Assistant Examiner* — Alexis A Boateng
(74) *Attorney, Agent, or Firm* — Finnegan, Henderson, Farabow, Garrett & Dunner, LLP

(57) ABSTRACT

A battery system includes a lithium ion rechargeable battery including a power generating element having a laminated part, a positive electrode extended part, and a negative electrode extended part. The battery system further includes a controller and a detector that detects the temperatures of a central laminated part in the laminated part, and at least one of a positive-side temperature detector that detects the temperatures of a positive side-laminated part in the laminated part and a negative-side temperature detector that detects the temperatures of a negative-side laminated part in the stacked part. The controller controls the lithium ion rechargeable battery using the temperature of the central laminated part, and at least one of the temperature of the positive-side laminated part and the temperature of the negative-side laminated part.

7 Claims, 18 Drawing Sheets

(51) Int. Cl.
  H01M 10/48 (2006.01)
  H01M 10/617 (2014.01)
  H01M 10/6235 (2014.01)
  H01M 10/625 (2014.01)
  H01M 10/63 (2014.01)
  H01M 10/652 (2014.01)
  H01M 2/02 (2006.01)

(52) U.S. Cl.
  CPC ........ H01M10/502 (2013.01); H01M 10/5038 (2013.01); *Y02E 60/122* (2013.01); *Y02T 10/7011* (2013.01)

(56) References Cited

U.S. PATENT DOCUMENTS 7,960,047 B2 * 6/2011 Berg ................................ 429/61
2002/0001745 A1 * 1/2002 Gartstein et al. ................. 429/61
2005/0118500 A1 * 6/2005 Yata et al. ...................... 429/162
2005/0130037 A1 * 6/2005 Kaneta et al. .................. 429/178
2009/0021217 A1 * 1/2009 Nakazawa et al. ............. 320/134
2009/0195210 A1 * 8/2009 Takeuchi et al. ............... 320/134
2010/0285349 A1   11/2010 Goto et al.
2012/0032644 A1   2/2012 Hagiwara et al.

FOREIGN PATENT DOCUMENTS

| JP | 2000-277176 | 10/2000 |
| JP | 2002-313431 | 10/2002 |
| JP | 2007-141558 | 6/2007 |
| JP | 2008-59910 | 3/2008 |
| JP | 2010-218877 | 9/2010 |
| WO | WO 2009/093664 | 7/2009 |
| WO | WO 2010/119566 | 10/2010 |

* cited by examiner

BATTERY SYSTEM, VEHICLE, AND BATTERY-MOUNTING DEVICE

CROSS-REFERENCE TO RELATED APPLICATIONS

This is a national phase application based on the PCT International Patent Application No. PCT/JP2009/057754 filed on Apr. 17, 2009, the entire contents of which are incorporated herein by reference.

TECHNICAL FIELD

The present invention relates to a battery system including a lithium ion secondary (rechargeable) battery including a power generating element, a temperature detecting means for detecting the temperature of the power generating element, and a control means for controlling the lithium ion secondary battery. The present invention further relates to a vehicle and a battery-mounting device, each of which includes the battery system.

BACKGROUND ART

Recently, a lithium ion secondary battery (hereinafter, simply also referred to as a battery) is utilized as a power source for driving a hybrid vehicle or a portable electronic device such as a notebook-sized personal computer, a video camera corder, etc.

As one of such batteries, Patent Literature 1 discloses a lithium ion secondary battery in which a thermocouple is embedded in a predetermined portion of a battery main body (a power generating element).

CITATION LIST

Patent Literature

Patent Literature 1: JP10(1998)-55825 A

SUMMARY OF INVENTION

Technical Problem

Meanwhile, of the power generating element of the battery, a laminated part functioning as a battery and including a positive electrode and a negative electrode both being laminated by interposing a separator therebetween has a spread or extent in a parallel direction to a surface of the positive electrode and others. Accordingly, it has been found that the laminated part has, locally in the above direction, nonuniform concentration of an electrolyte solution retained between the positive and negative electrodes, nonuniform current density during operation, nonuniform temperature resulting from a local difference in heat radiation characteristics.

Further, it has also been found that, in a positive-negative electrode extending direction that joins a positive electrode extended part which is a part of the positive electrode plate extending from the laminated part and a negative electrode extended part which is a part of the negative electrode plate extending from the laminated part, assuming that this laminated part is divided into a central laminated part, a positive-side laminated part located closer to the positive electrode extended part than the central laminated part is, and a negative-side laminated part located closer to the negative electrode extended part than the central laminated part is, the above nonuniformity is distributed differently between the three parts in many cases.

Furthermore, it has also been revealed that the occurrence of various nonuniformity occurring in the laminated part can be detected from temperatures of the central laminated part, the positive-side laminated part, and the negative-side laminated part, a temperature change before and after discharge or before and after charge, and the battery could be controlled based on a detection result.

However, as to the battery disclosed in Patent Literature 1, only a predetermined portion of the laminated part of the power generating element could be measured. Thus, the various nonuniformity occurring in the laminated part cannot be detected appropriately.

The present invention has been made to solve the above problems and has a purpose to provide a battery system capable of appropriately detecting a temperature and a temperature change distribution occurring in a laminated part of a power generating element of a lithium ion secondary battery in a positive-negative extending direction to utilize a detection result for control of the battery. Another purpose is to provide a vehicle and a battery-mounting device each including the battery system.

Solution to Problem

To achieve the above purpose, one aspect of the invention provides a battery system comprising: a lithium ion secondary battery having a power generating element including a positive electrode plate, a negative electrode plate, and a separator, the power generating element including a laminated part in which the positive electrode plate and the negative electrode plate are laminated by interposing the separator therebetween, a positive extended part formed of a part of the positive electrode plate extending from the laminated part, and a negative extended part formed of a part of the negative electrode plate extending from the laminated part in an opposite direction to the positive extended part; control means for controlling the lithium ion secondary battery; when a positive and negative extending direction is defined as a direction joining the positive extended part and the negative extended part, central temperature detecting means for detecting a temperature of a central laminated part located in the center of the laminated part in the positive and negative extending direction; and at least one of: positive-side temperature detecting means for detecting a temperature of a positive-side laminated part of the laminated part, the positive-side laminated part being located closer to the positive extended part in the positive and negative extending direction than the central laminated part is, and negative-side temperature detecting means for detecting a temperature of a negative-side laminated part of the laminated part, the negative-side laminated part being located closer to the negative extended part in the positive and negative extending direction than the central laminated part is, the control means being arranged to control the lithium ion secondary battery by use of the temperature of the central laminated part and at least one of the temperature of the positive-side laminated part, and the temperature of the negative-side laminated part.

The above battery system comprises the central temperature detecting means, at least one of the positive-side temperature detecting means, and the negative-side temperature detecting means, and the control means. Thus, by use of the temperature of the central laminated part and the temperature of the positive-side laminated part or the negative-side laminated part, for example, it is possible to calculate a temperature difference between the parts, a difference in temperature rise amount before and after discharge between the parts, and others. The battery can therefore be appropriately controlled based on the calculation results.

The above battery system uses the temperature of each part and hence can more easily detect various nonuniformity occurring in the laminated part than in the case where a lithium ion concentration of an electrolyte solution and others in each part is directly detected.

The type of the power generating element may include a winding type that a positive electrode plate and a negative electrode plate, each having a strip shape, are wound by interposing a separator therebetween and a laminated type that positive electrode plates and negative electrode plates, having a rectangular plate-like shape respectively, are laminated by interposing separators therebetween. Further, as the central temperature detecting means, the positive-side temperature detecting means, and the negative-side temperature detecting means, for example, a thermocouple and a thermistor may be adopted.

The control to be executed by the control means may include the control of battery current during charge and discharge, the control of temperature of the central laminated part, the positive-side laminated part, and the negative-side laminated part by use of a heater or a cooling element, etc.

In performing the control by use of the temperature of the central laminated part and others, the control means utilizes the temperature itself of each part and besides can use a difference in temperature between the parts and a difference in temperature rise amount generated before and after the discharge of the battery between the parts.

In the above battery system, preferably, the control means includes limitation changing means for changing limitation of charge and discharge current to be allowed to flow in the lithium ion secondary battery during high-rate charge and discharge based on a rise amount difference between a temperature rise amount of the temperature rise in the central laminated part and at least one of a temperature rise amount of the temperature rise in the positive-side laminated part and a temperature rise amount of the temperature rise in the negative-side laminated part, the difference being generated by the high-rate discharge.

For instance, it has been found that when high-rate discharge or charge with a current of 10 C for example is performed, a current density is distributed according to a lithium ion concentration distribution of an electrolyte in the laminated part, and also a heating amount in each part is distributed. Accordingly, by comparing the temperature rise amounts in the parts occurring during the high-rate discharge, it is possible to acquire a difference in current density between the parts and hence a difference in lithium ion concentration of the electrolyte solution.

In the above battery system, the control means includes the above limitation changing means. Accordingly, based on at least one of the difference in temperature rise amount between the central laminated part and the positive-side laminated part and the difference in temperature rise amount between the central laminated part and the negative-side laminated part, the limitation changing means changes the limitation of discharge current for the high-rate discharge. This makes it possible to perform appropriate control to battery deterioration caused by the high-rate discharge.

Furthermore, in the above battery system, preferably, the limitation changing means changes the control to relatively decrease a discharge current of subsequent high-rate discharge when the temperature rise amount of the central laminated part is smaller than one of the temperature rise amount of the positive-side laminated part and the temperature rise amount of the negative-side laminated part.

Meanwhile, it has been found that when the battery is repeatedly discharged with a relatively large current (high-rate) of 10 C for example, battery deterioration (high-rate deterioration) such as an increase in internal resistance is caused.

In a battery in which no high-rate deterioration has occurred, a temperature rise amount that occurs during high-rate discharge is larger in the central laminated part than in the positive-side laminated part and the negative-side laminated part. On the other hand, as the high-rate deterioration resulting from the high-rate discharge progresses, the temperature rise amount in the central laminated part decreases, whereas the temperature rise amounts in the positive-side laminated part and the negative-side laminated part increase. Accordingly, the temperature rise amount of the central laminated part finally becomes equal to those of the positive-side laminated part and the negative-side laminated part. Thereafter, reversely, the temperature rise amount of the central laminated part becomes smaller than those of the positive-side laminated part and the negative-side laminated part.

In consideration of the above knowledge, the limitation changing means of the above battery system changes the control to relatively decrease the discharge current for the subsequent high-rate discharge when the temperature rise amount of the central laminated part becomes smaller than the temperature rise amounts of the positive-side laminated part and the negative-side laminated part. This can restrain progression of the battery high-rate deterioration, i.e., increase in the internal resistance. Furthermore, in some cases, the high-rate deterioration caused in the battery can be restored.

For relatively reducing the detecting current for the high-rate discharge, it may be achieved by a technique of limiting the value of a peak discharge current in the high-rate discharge generated under rapid acceleration to a smaller value, a technique of shortening a period of a larger discharge current than a predetermined value, etc.

Alternatively, in the above battery system, preferably, the battery system includes the negative-side temperature detecting means, and the limitation changing means changes the control to relatively increase a discharge current of subsequent high-rate discharge when the temperature rise amount of the central laminated part is smaller than the temperature rise amount of the negative-side laminated part.

The present inventors found out that when the battery was subjected to repeated high-rate discharge, the internal resistance increased once but then decreased and became stable. Consequently, when the high-rate deterioration is forced to progress, thereby causing the battery to go through a high internal resistance state, a rather preferable (a low internal resistance) state can be established later. For a period in which the internal resistance is high while the high-rate deterioration is progressing, the temperature rise amount of the central laminated part becomes smaller than the temperature rise amounts of the positive-side laminated part and the negative-side laminated part. For a period in which the internal resistance decreases past the above period, the temperature rise amount of the positive-side laminated part decreases.

Accordingly, it has been found that the temperature rise amount of the central laminated part is smaller than the temperature rise amount of the negative-side laminated part but almost equal to the temperature rise amount of the positive-side laminated part.

Based on the above knowledge, in the above battery system, the control changing means changes the control to relatively increase the discharge current for the subsequent high-rate discharge in the case where the temperature rise amount of the central laminated part is smaller than the temperature rise amount of the negative-side laminated part. By relatively increasing the discharge current for the high-rate discharge as above, the high-rate deterioration of the battery is prompted. Thus, the battery is caused to quickly go through a high internal resistance state and then can be used in a low internal resistance state.

For relatively increasing a discharge current for the high-rate discharge, it may be achieved by a technique of changing the value of a peak discharge current in the high-rate discharge to a larger value, a technique of lengthening a period of a larger discharge current than a predetermined value, etc.

Alternatively, the above battery system, preferably, includes: central temperature changing means for changing a temperature of the central laminated part of the power generating element; positive-side temperature changing means for changing a temperature of the positive-side laminated part of the power generating element; and negative-side temperature changing means for changing a temperature of the negative-side laminated part of the power generating element, wherein the control means includes temperature control means for controlling the central temperature changing means, the positive-side temperature changing means, and the negative-side temperature changing means.

The above battery system includes the above temperature changing means and also the control means includes the temperature control means. Accordingly, based on the temperature of the central laminated part of the measured power generating element and at least one of the temperature of the positive-side laminated part and the temperature of the negative-side laminated part, the temperatures of the central laminated part, the positive-side laminated part, and the negative-side laminated part can be appropriately changed. This enables appropriate temperature control by for example controlling the temperatures to eliminate nonuniformity of lithium ion concentration generated in the laminated part and others.

As the central temperature changing means, the positive-side temperature changing means, and the negative-side temperature changing means, for instance, a heater that generates heat when energized and a Peltier element that absorbs heat when energized may be adopted.

Alternatively, another aspect of the invention provides a vehicle including one of the aforementioned battery systems.

The above vehicle includes the aforementioned battery system. Thus, the vehicle can calculate a temperature difference between the parts, a difference in temperature rise amount before and after in each part based on the temperatures of the central laminated part, the positive-side laminated part, and the negative-side laminated part, and hence appropriately control the battery based on a calculation result.

It is to be noted that the vehicle may be any vehicle using electric energy of the battery in the whole or part of its power source. For instance, the vehicle may be an electric vehicle, a plug-in hybrid vehicle, a hybrid railroad vehicle, a forklift, an electric-driven wheel chair, an electric bicycle, an electric scooter, etc.

Alternatively, another aspect of the invention provides a battery-mounting device including one of the aforementioned battery systems.

The above battery-mounting device includes the aforementioned battery system, so that the battery-mounting device can calculate a temperature difference between the parts, a difference in temperature rise amount before and after each part based on the temperatures of the central laminated part, the positive-side laminated part, and the negative-side laminated part, and hence appropriately control the battery based on a calculation result.

It is to be noted that the battery-mounting device may be any device mounted with the battery and utilizes the battery as at least one of energy sources. For example, the device may be any one of various battery-driven home electric appliances, office equipment, and industrial equipment such as a personal computer, a cell phone, a battery-driven electric tool, an uninterruptible power supply system.

REFERENCE SIGNS LIST 1, 3 Battery (Lithium ion secondary battery)
20 Power generating element
20L Laminated part
20LX Positive-side laminated part
20LY Negative-side laminated part
20LZ Central laminated part
21 Positive electrode plate
21f Positive lead part (Positive electrode extended part)
22 Negative electrode plate
22f Negative lead part (Negative electrode extended part)
23 Separator
40X First element (Temperature control means)

40Y Second element (Temperature control means)
40Z Third element (Temperature control means)
50X First thermocouple (Central temperature detecting means)
50Y Second thermocouple (Positive-side temperature detecting means)
50Z Third thermocouple (Negative-side temperature detecting means)
100, 200, 300 Vehicle
130 Control unit (Control means)
400 Hammer drill (Battery-mounting device)
410 Battery pack
DA First direction (Positive-negative extending direction)
DC Discharge current (Charge and discharge current, Discharge current)
DTX Positive-side rise amount (Temperature rise amount (of positive-side laminated part))
DTY Negative-side rise amount (Temperature rise amount (of negative-side laminated part))
DTZ Central rise amount (Temperature rise amount (of central laminated part))
F1 First rise amount difference (Temperature rise amount difference)
F2 Second rise amount difference (Temperature rise amount difference)
M1, M2, M3 Battery system
TX0 Positive-side temperature (Temperature (of positive-side laminated part), Temperature (of laminated part))
TX1 Positive-side preceding temperature (Temperature (of positive-side laminated part), Temperature (of laminated part))
TX Positive-side post-discharge temperature (Temperature (of positive-side laminated part), Temperature (of laminated part))
TY0 Negative-side temperature (Temperature (of negative-side laminated part), Temperature (of laminated part))
TY1 Negative-side preceding temperature (Temperature (of negative-side laminated part), Temperature (of laminated part))
TY2 Negative-side post-discharge temperature (Temperature (of negative-side laminated part), Temperature (of laminated part))
TZ0 Central temperature (Temperature (of central laminated part), Temperature (of laminated part))
TZ1 Central preceding temperature (Temperature (of central laminated part), Temperature (of laminated part))
TZ2 Central post-discharge temperature (Temperature (of central laminated part), Temperature (of laminated part))

DESCRIPTION OF EMBODIMENTS

First Embodiment

A detailed description of a first preferred embodiment of the present invention will now be given referring to the accompanying drawings.

Figure 1:
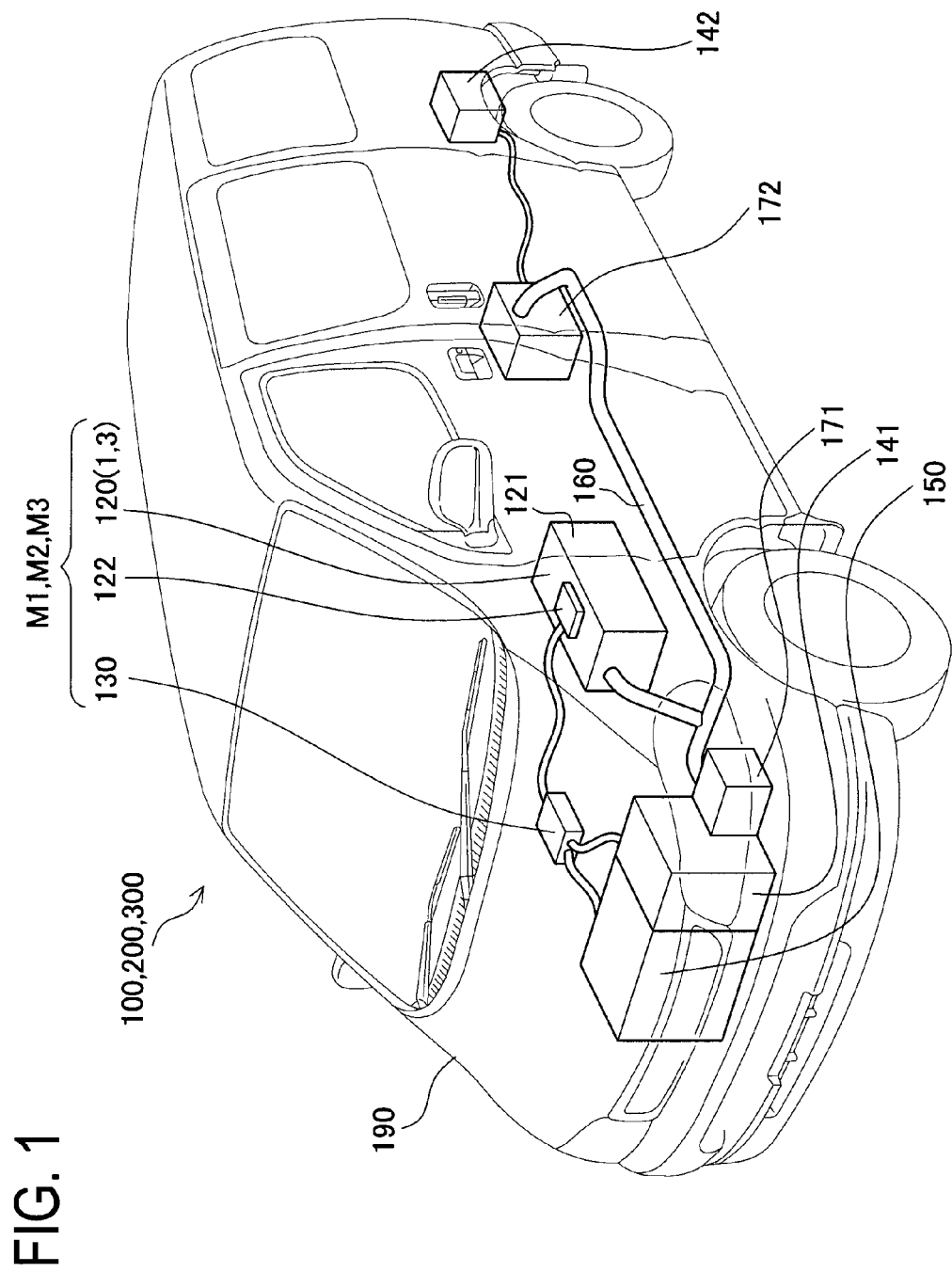
FIG. 1 is a perspective view of a vehicle in Embodiment 1, Embodiment 2, and Modified example 1.

Firstly, a vehicle 100 in Embodiment 1 is explained. FIG. 1 is a perspective view of the vehicle 100.

This vehicle 100 is a hybrid electric vehicle including a plurality of lithium ion secondary batteries (hereinafter, also simply referred to as batteries) 1 constituting a battery pack 120, thermocouples 50X, 50Y, and 50Z for detecting the temperatures of a power generating element 20 of each battery 1 respectively, and a control unit 130. In addition, the vehicle 100 includes an engine 150, a front electric motor 141, a rear electric motor 142, a cable 160, a first inverter 171, a second inverter 172, and a vehicle body 190. The thermocouples 50X, 50Y, and 50Z are connected to a battery monitor 122. A battery system M1 in Embodiment 1 is constituted of the batteries 1, the thermocouples 50X, 50Y, and 50Z (the battery monitor 122 connected to them), and the control unit 130.

The control unit 130 of the vehicle 100 has a CPU, a ROM, and a RAM not shown, and includes a microcomputer that is operated by a predetermined program. This control unit 130 communicates with the front motor 141, the rear motor 142, the engine 150, the first inverter 171, the second inverter 172, and the battery monitor 122, respectively, each of which is mounted in the vehicle 100. This control unit 130 controls the front motor 141, the rear motor 142, the engine 150, the first inverter 171, and the second inverter 172.

The battery pack 120 of the vehicle 100 includes a battery pack part 121 in which the batteries 1 are arranged and the battery monitor 122 (see FIG. 1). The battery monitor 122 obtains the temperatures of the power generating element of each battery 1 via the thermocouples 50X, 50Y, and 50Z.

Further, the battery part 121 contains the batteries 1 fastened to a bus bar (not shown) with bolts and thus connected in series with each other.

Figure 2:
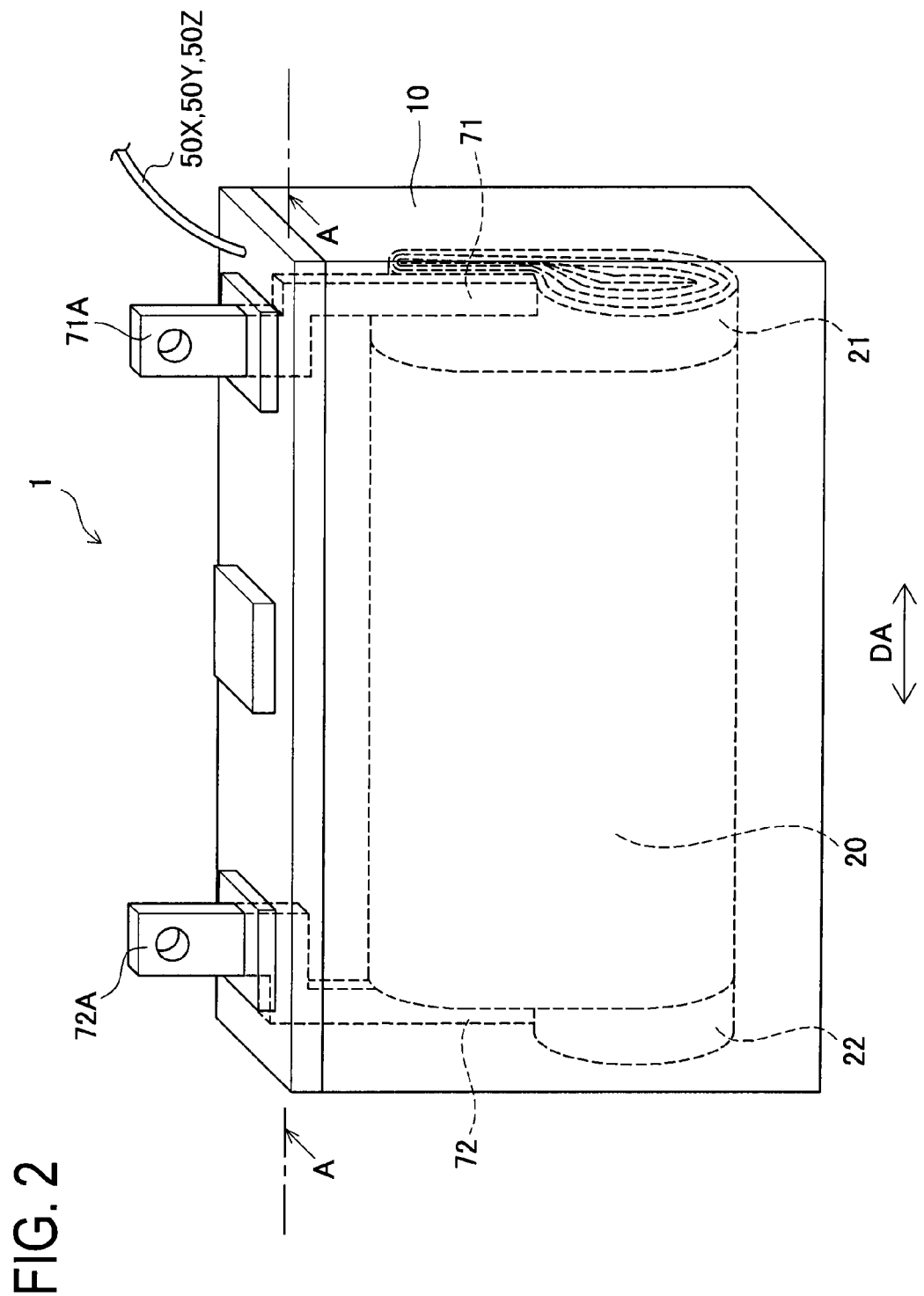
FIG. 2 is a perspective view of a lithium ion secondary battery in Embodiment 1 and Modified example 1.
Figure 3:
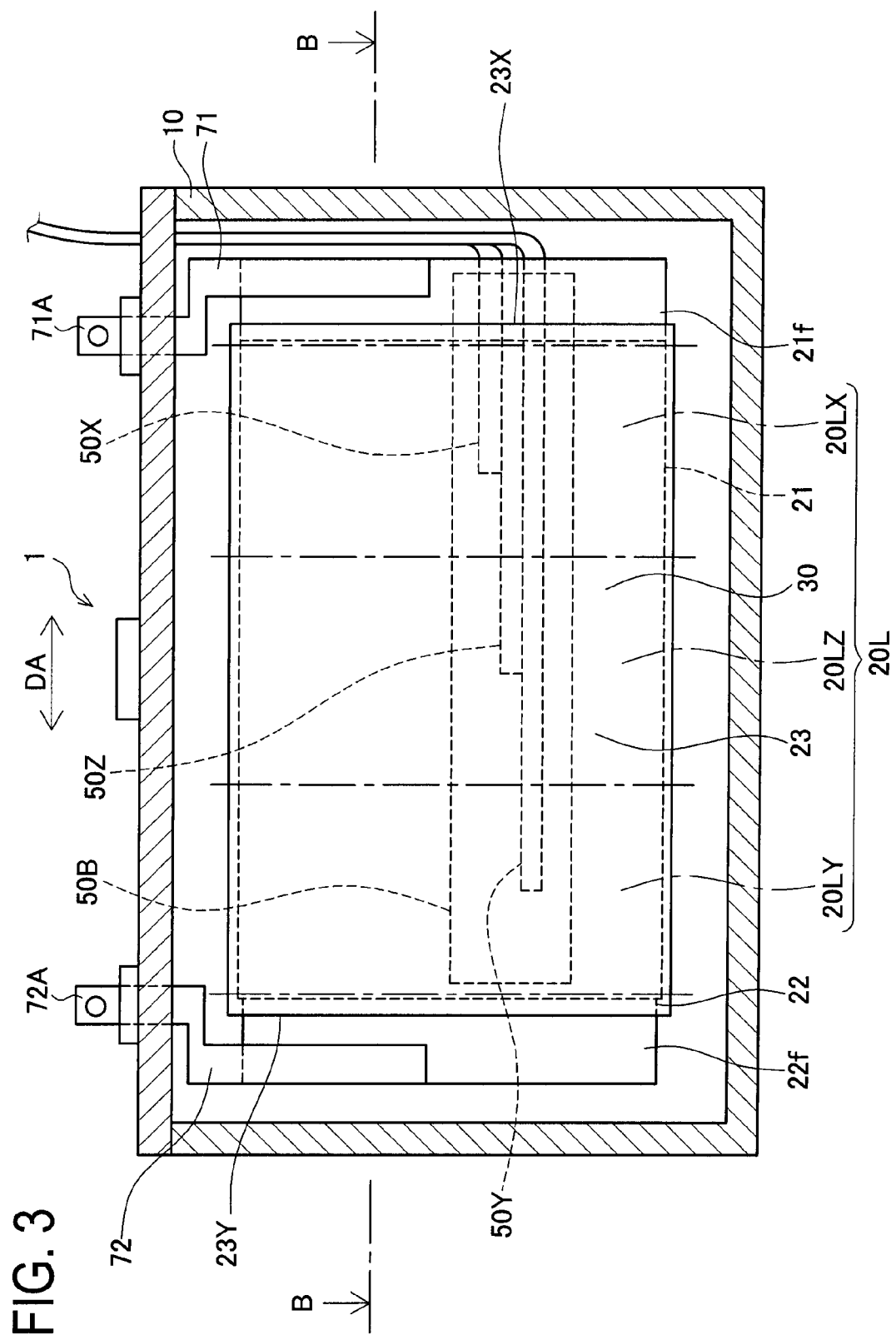
FIG. 3 is a cross-sectional view of the lithium ion secondary battery in Embodiment 1 and Modified example 1 (a cross-sectional view along A-A in FIG. 2)

Each battery 1 is a winding-type lithium ion secondary battery having the power generating element 20 including a positive electrode plate 21, a negative electrode plate 22, and a separator 23 (see FIGS. 2-4). The power generating element 20 is housed in a rectangular box-shaped battery case 10.

Figure 4A:
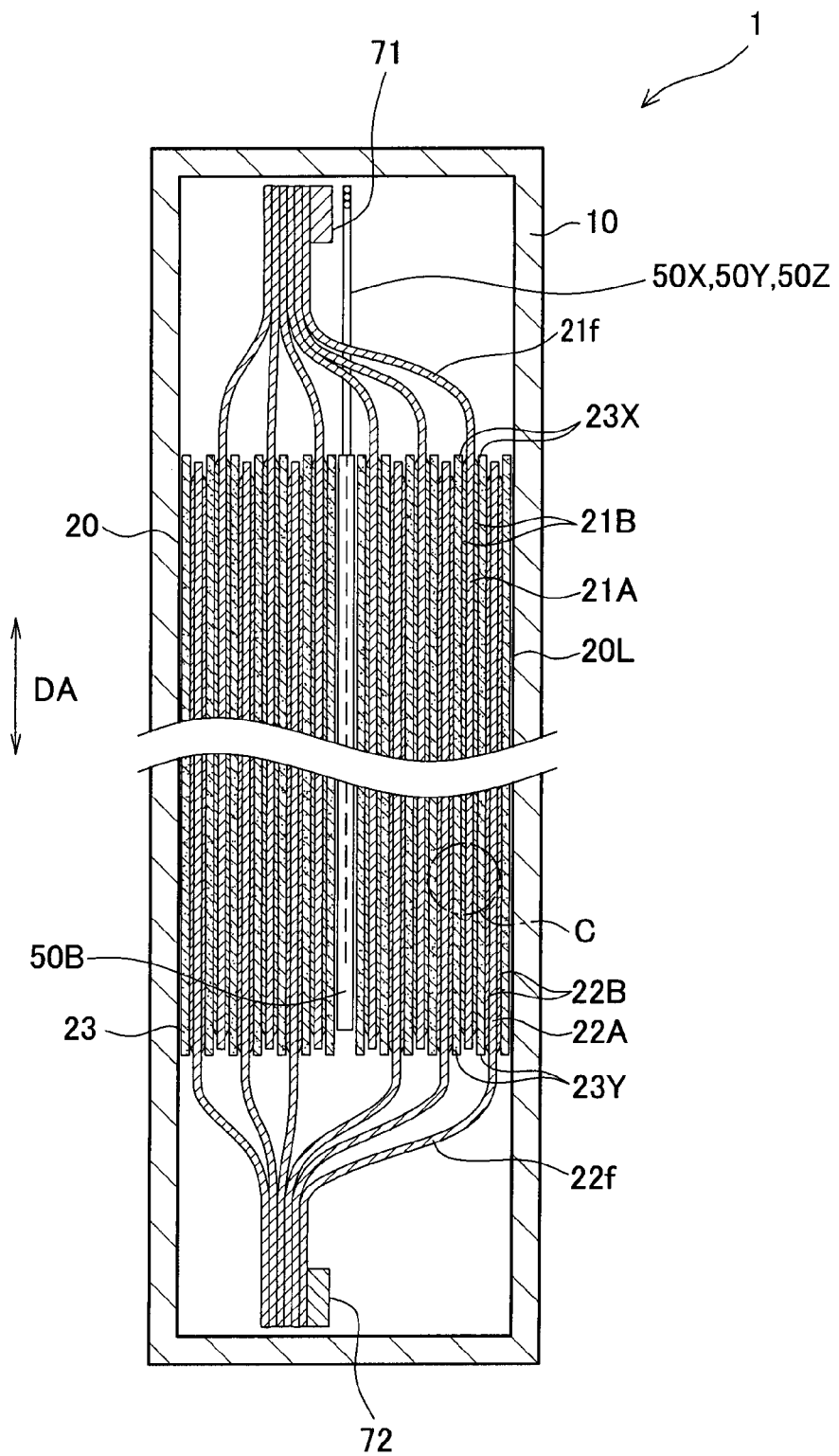
FIG. 4A is a cross-sectional view of the lithium ion secondary battery in Embodiment 1 and Modified example 1 (a cross-sectional view along B-B in FIG. 3)
Figure 4B:
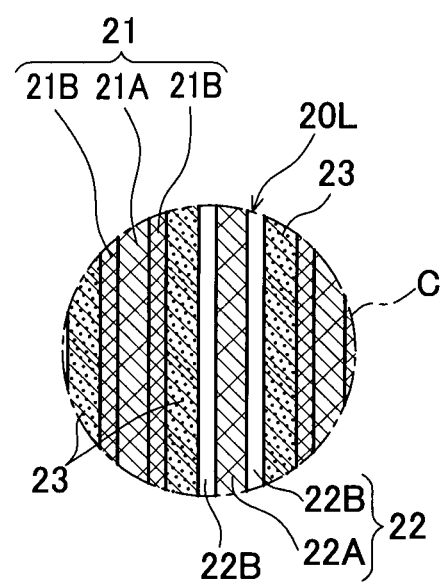
FIG. 4B is an enlarged cross-sectional view of the lithium ion secondary battery in Embodiment 1 and Modified example 1 (a part C in FIG. 4A)

This power generating element 20 is configured such that the positive electrode plate 21 and the negative electrode plate 22, each having a strip shape, are wound in flat form by interposing the strip-shaped separator 23 made of polyethylene therebetween (see FIG. 2). This power generating element 20 includes, as shown in FIG. 4A, a laminated part 20L in which the positive electrode plate 21, the negative electrode plate 22, and the separator 23 are laminated, a positive lead part 21f of the positive electrode plate 21, extending upward from this laminated part 20L in FIG. 4A, and a negative lead part 22f of the negative electrode plate 22, extending downward in FIG. 4A. The positive lead part 21f is joined with a positive current collector 71 having a crank-like bent plate shape (see FIG. 3). A positive terminal 71A located at a leading end (upper in FIG. 3) of the positive current collector 71 protrudes upward from the battery case 10 in FIG. 3. The negative lead part 22f is joined with a negative current collector 72 having a crank-like bent plate shape (see FIG. 3). A negative terminal 72A located at a leading end of the negative current collector 72 (upper in FIG. 3) protrudes upward from the battery case 10 in FIG. 3.

The positive electrode plate 21 is made from a strip-shaped aluminum foil 21A and positive active material layers 21B. This positive electrode plate 21 carries the positive active material layers 21B on both surfaces of the aluminum foil 21A excepting the positive lead part 21f (see FIGS. 4A and 4B).

The negative electrode plate 22 is made from a strip-shaped copper foil 22A and direction active material layers 22B. This negative electrode plate 22 carries the negative active material layers 22B on both surfaces of the copper foil 22A excepting the negative lead part 22f (see FIGS. 4A and 4B).

In Embodiment 1, as shown in FIG. 3, assuming that a direction joining the positive lead part 21f to the negative lead part 22f (a direction along a winding axis) is a first direction DA, the laminated part 20L of the power generating element 20 is divided in a perpendicular direction to this first direction DA into three sections. Specifically, the laminated part 20L is assumed to include a central laminated part 20LZ located at the center in the first direction DA, a positive-side laminated part 20LX which is located closer to the positive lead part 21*f* than the central laminated part 20LZ is, and a negative laminated part 20LY which is located closer to the positive lead part 21*f* than the central laminated part 20LZ is (see FIG. 3).

In the laminated part 20L, the first thermocouple 50X is placed in the positive-side laminated part 20LX, the second thermocouple 50Y is placed in the negative-side laminated part 20LY, and the third thermocouple 50Z is placed in the central laminated part 20LZ (see FIG. 3).

Figure 5:
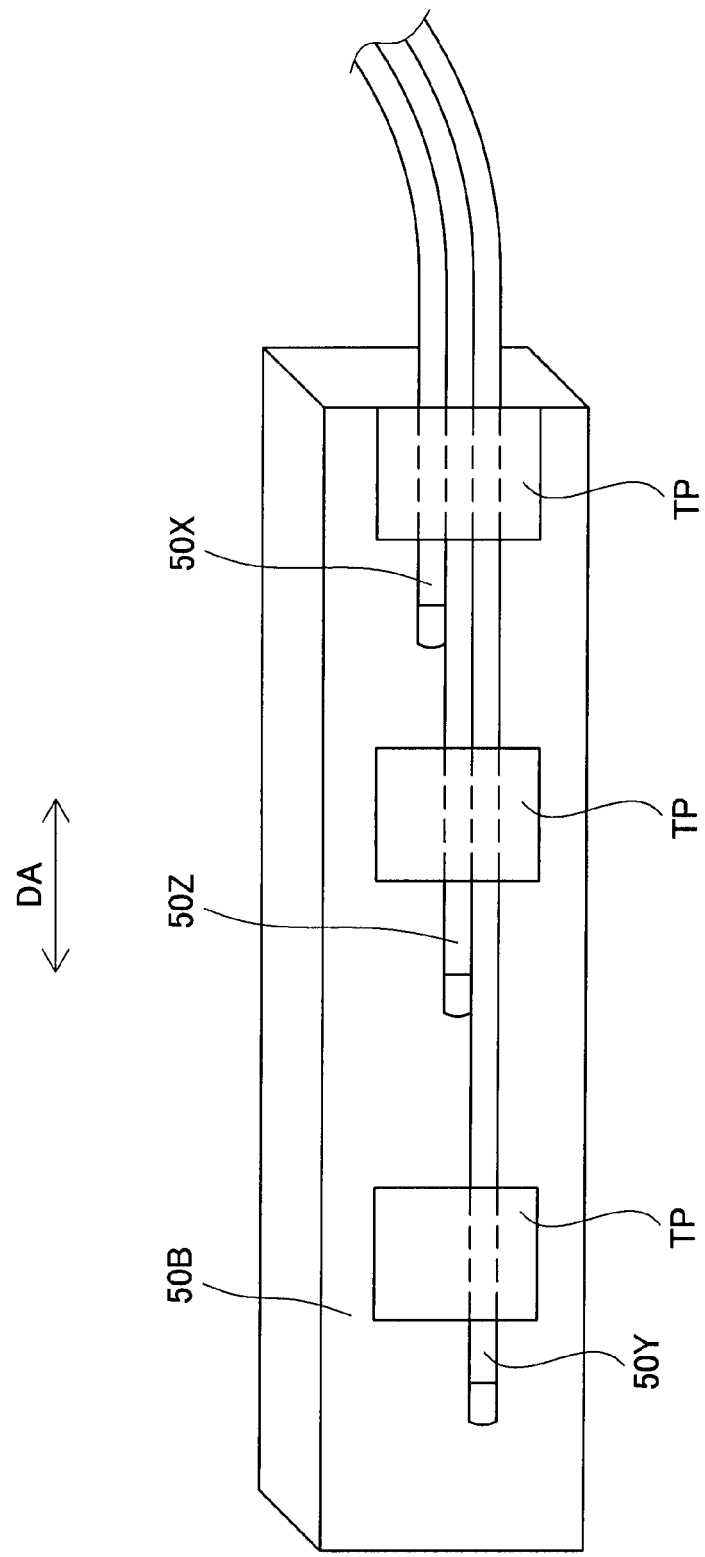
FIG. 5 is an explanatory view of a temperature in Embodiment 1 and Modified example 1.

Specifically, a rectangular plate member 50B made of resin, on which the first thermocouple 50X, the second thermocouple 50Y, and the third thermocouple 50Z are arranged and fixed, is inserted in an axial core of the wound power generating element 20 (see FIGS. 3 and 4A). In this plate member 50B, as shown in FIG. 5, a leading end of the first thermocouple 50X, that is, a measuring junction thereof is fixed to a right portion of the plate member 50B in the figure with an insulation tape TP. A measuring junction of the second thermocouple 50Y is fixed to a left portion of the plate member 50B in the figure with an insulation tape TP and a measuring junction of the third thermocouple 50Z is fixed to a central portion of the plate member 50B in the first direction DA with an insulation tape TP.

Those first, second, and third thermocouples 50X, 50Y, and 50Z are all Type K thermocouples (Chromel-Alumel). Further, those first, second, and third thermocouples 50X, 50Y, and 50Z are extended in a bundle out of the battery case 10 and connected to the battery monitor 122.

Meanwhile, the present inventors found the following fact. When high-rate discharge is repeated by supply of a high-rate current as large as 10 C for example, the battery 1 deteriorates (High-rate deterioration). Simultaneously, the lithium ion concentrations of the electrolyte in the positive-side laminated part 20LX, the negative-side laminated part 20LY, and the central laminated part 20LZ of the laminated part 20L of the power generating element 20, which were uniform at the time of battery manufacture, come to differ from each other.

Specifically, the battery 1 was first subjected to a cycle test in which high-rate discharge, that is, pulse charge and discharge are repeated by charging at a constant current of 100 A for 10 seconds and then charging at a constant current of 10 A for 100 seconds. The value of internal resistance of the battery 1 was measured after a predetermined number of cycles.

Figure 6:
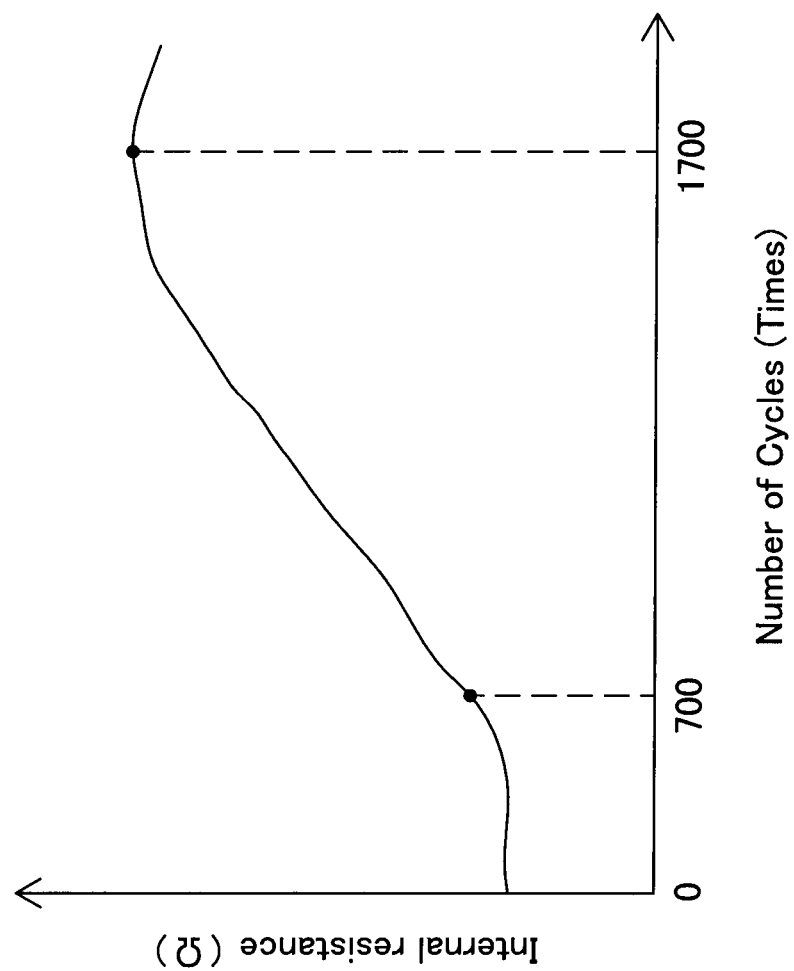
FIG. 6 is a graph showing a relationship between internal resistance of the lithium ion secondary battery and the number of cycles in a charge and discharge cycle test.

This test result is shown in FIG. 6. The value of internal resistance of the battery 1 greatly increases as the number of cycles approaches 700 and becomes maximum when the number of cycles reaches around 1700.

In addition to the measurement of the internal resistance of the battery 1, the lithium ion concentration of the electrolyte in each portion of the laminated part 20L was measured at the test start time and at the number of cycles of 1700, respectively.

Figure 7:
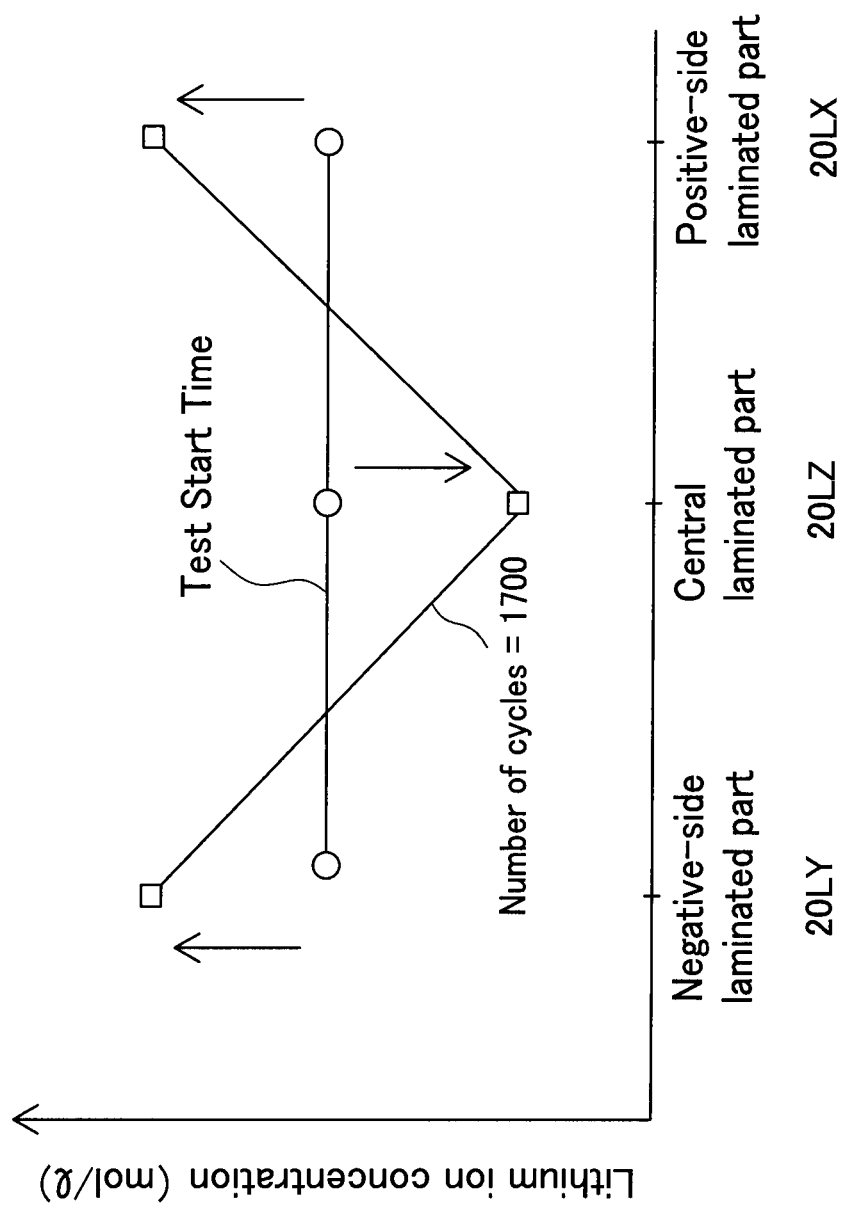
FIG. 7 is a graph showing lithium ion concentration in each laminated part of the lithium ion secondary battery.

Measurement results are shown in FIG. 7. FIG. 7 is a graph showing the lithium ion concentration in each of the positive-side laminated part 20LX, the negative-side laminated part 20LY, and the central laminated part 20LZ. This graph reveals that the lithium ion concentrations in the positive-side laminated part 20LX and the negative-side laminated part 20LY at the number of cycles of 1700 are higher than at the test start time. On the other hand, the lithium ion concentration in the central laminated part 20LZ at the number of cycles of 1700 is lower than at the test start time.

It is found that when the high-rate discharge is further performed in this state, the heating values are distributed in each place. This is conceivably because a current density is distributed according to the distribution of the lithium ion concentration of the electrolyte in the laminated part 20L.

Therefore, in addition to the measurement of the internal resistance of the battery 1, the temperature of each of the positive-side laminated part 20LX, the negative-side laminated part 20LY, and the central laminated part 20LZ was measured before and after the high-rate discharge, at the time just after the test start (the number of cycles=1), at the number of cycles of 700, and at the number of cycles of 1700 by use of the first thermocouple 50X, the second thermocouple 50Y, and the third thermocouple 50Z. To be concrete, the temperature before the high-rate discharge was measured, and then the battery 1 was discharged with a constant current of 100 A and the temperature after 10 seconds from the start of discharge was measured.

Based on the above temperatures, a temperature rise amount (a difference between a temperature after the high-rate discharge and a temperature immediately before the high-rate discharge) in each of the positive-side laminated part 20LX, the negative-side laminated part 20LY, and the central laminated part 20LZ was calculated.

Figure 8:
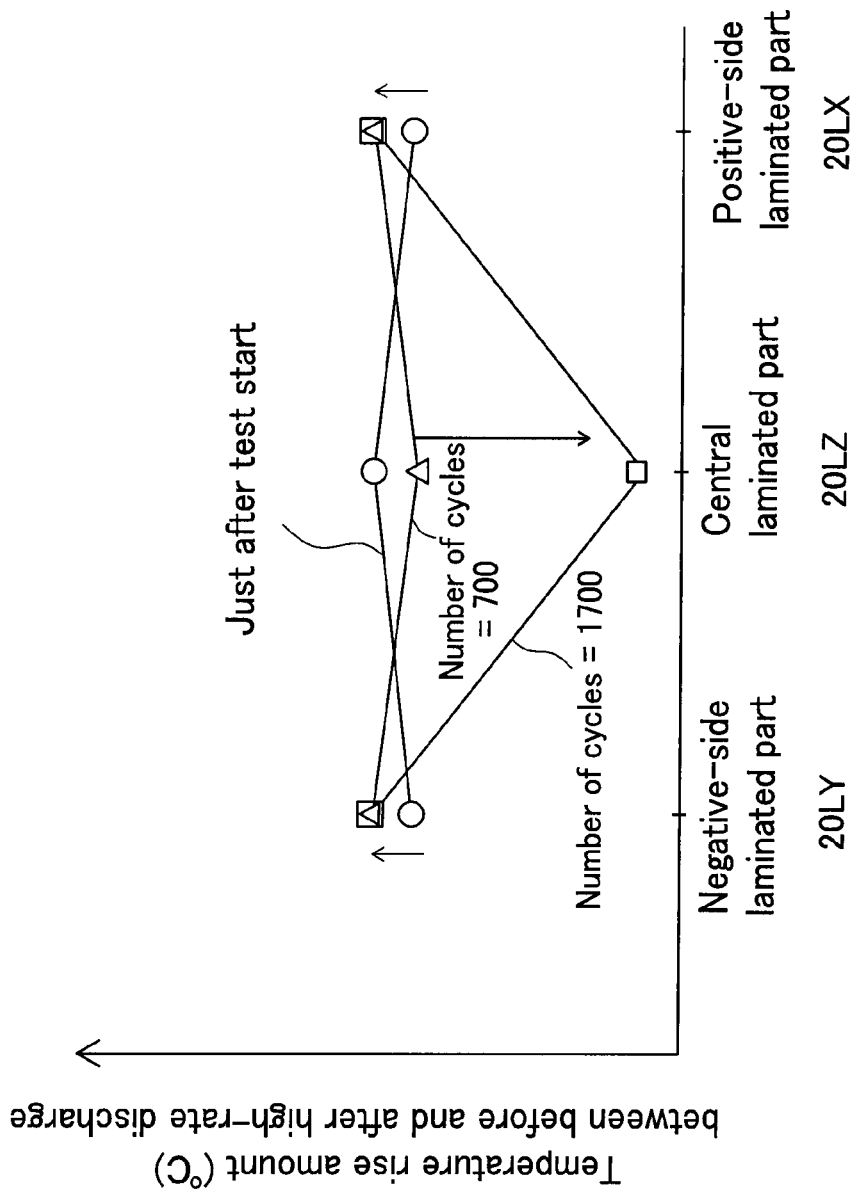
FIG. 8 is a graph showing a temperature rise amount in each laminated part of the lithium ion secondary battery.

Calculation results are shown in FIG. 8. FIG. 8 is a graph showing a temperature rise amount in each of the positive-side laminated part 20LX, the negative-side laminated part 20LY, and the central laminated part 20LZ. This graph reveals that the temperature rise amounts in the positive-side laminated part 20LX and the negative-side laminated part 20LY at the number of cycles of 700 and 1700 are higher than at the time just after the test start (the number of cycles=1). On the other hand, the temperature rise amount in the central laminated part 20LZ at the number of cycles of 700 and 1700 is lower than at the time just after the test start.

In the battery 1 in which no high-rate deterioration has occurred yet, at the time just after the test start, the temperature rise amount in the central laminated part 20LZ occurring at the high-rate discharge is slightly larger than in the positive-side laminated part 20LX and the negative-side laminated part 20LY. This is conceivably because the central laminated part 20LZ is more unlikely to radiate heat than the positive-side laminated part 20LX and the negative-side laminated part 20LY and therefore the temperature increases.

As the high-rate deterioration advances by the high-rate discharge, the temperature rise amount in the central laminated part 20LZ gradually decreases, whereas the temperature rise amounts in the positive-side laminated part 20LX and the negative-side laminated part 20LY increase. Accordingly, at the number of cycles of 500 prior to 700, the temperature rise amount becomes equal between the central laminated part 20LZ and the positive-side laminated part 20LX or the negative-side laminated part 20LY. Furthermore, at the later number of cycles of 700 and 1700, reversely, the temperature rise amount in the central laminated part 20LZ becomes smaller than those in the positive-side laminated part 20LX and the negative-side 20LY.

Figure 9:
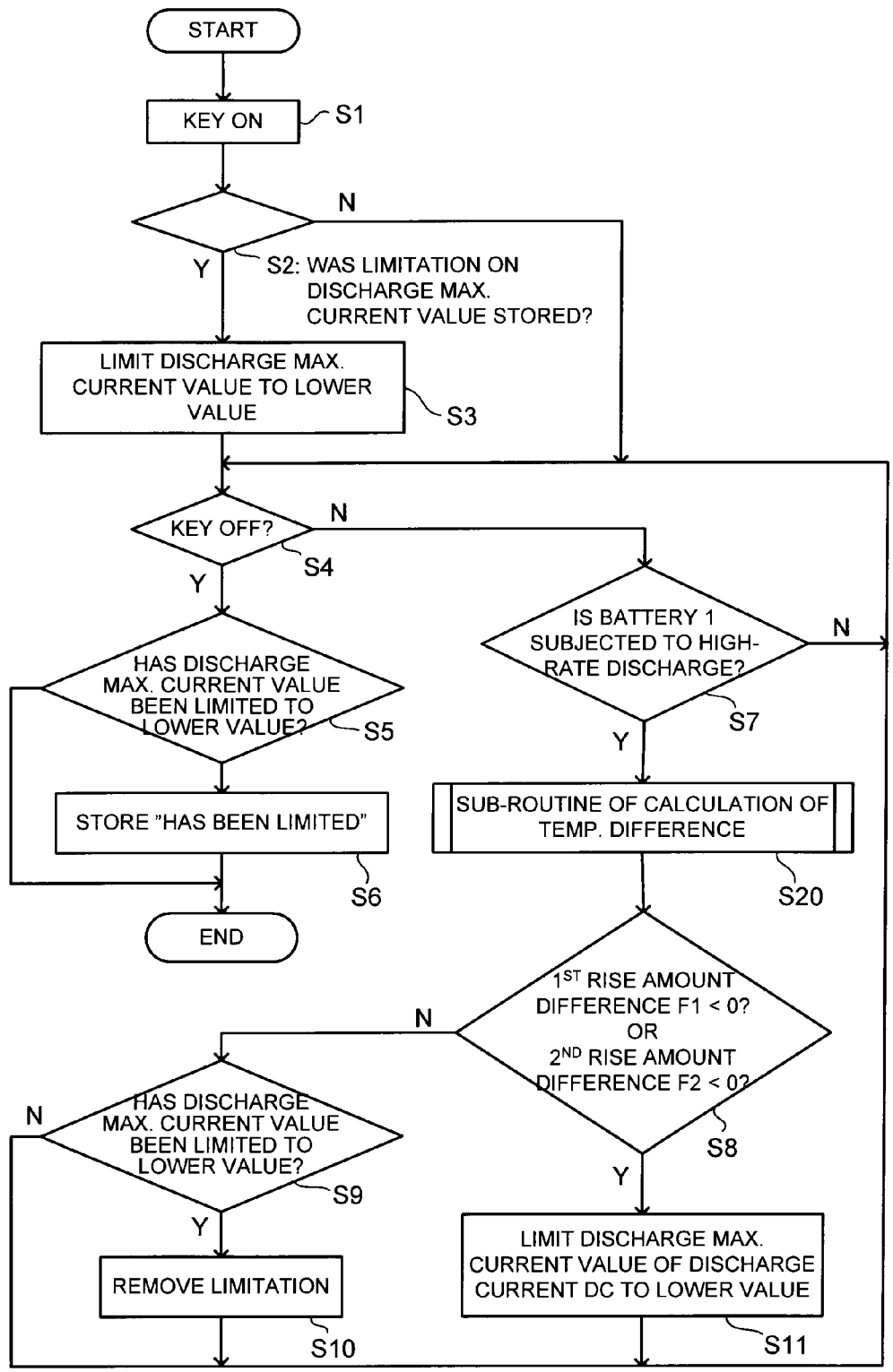
FIG. 9 is a flowchart in Embodiment 1.
Figure 10:
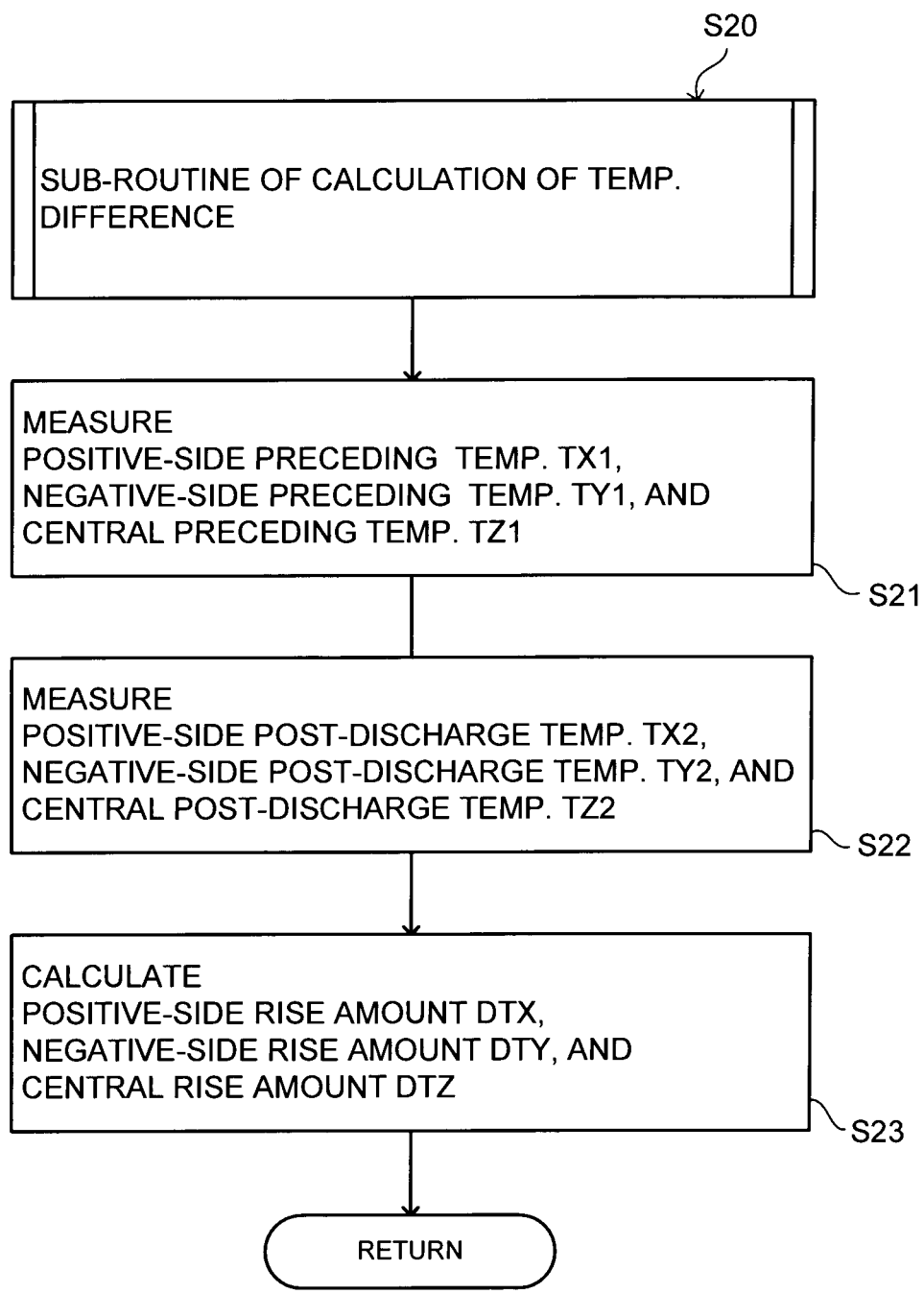
FIG. 10 is a flowchart in Embodiment 1 and Modified example 1.

Based on the above experimental results, the control of the battery 1 in the battery system M1 in Embodiment 1 will be explained in detail with reference to flowcharts in FIGS. 9 and 10.

When the vehicle 100 is started to operate (Key ON) (step S1), the control unit 130 of the vehicle 100 is activated. In step S2, it is judged whether or not the control unit 130 stored at the preceding stop time of operation of the vehicle 100 that the control was changed to the control to limit a discharge maximum current value allowed to flow from the battery 1 to a lower value. It is to be noted that "Limiting the discharge maximum current value to a lower value" indicates limiting a maximum value of discharge current DC allowed to flow in the battery 1 for discharge, to a lower value than before this limitation.

If NO in this step, that is, if it was not stored that the discharge maximum current value was limited to a lower one, the flow advances to step S4. On the other hand, if YES, that is, if it was stored that the discharge maximum current value was limited to a lower one, the flow advances to step S3 in which the discharge maximum current value of the discharge current DC of the battery 1 is limited to a lower one during the present operation, and then goes to step S4.

In step S4, successively, it is judged whether or not the stop of operation (Key OFF) of the vehicle 100 is instructed.

If NO in this step, that is, if the operation of the vehicle 100 is not stopped (not Key OFF), the flow advances to step S7. On the other hand, if YES, that is, if the operation of the vehicle 100 is stopped (Key OFF), the flow goes to step S5 in which it is judged whether or not the discharge maximum current value has been limited to be lower at the present operation stop time.

If NO in this step, that is, if the discharge maximum current value has not been limited to be lower at the present operation stop time, the operation is stopped directly. On the other hand, if YES, that is, if the discharge maximum current value has been limited to a lower one at the present operation stop time, the flow goes to step S6 in which the control unit 130 stores that the discharge maximum current value has been limited to a lower value, and then the operation is stopped.

In step S7, on the other hand, it is determined whether or not the battery 1 is subjected to high-rate discharge.

If NO in this step, the battery 1 is not subjected to the high-rate discharge, the flow returns to step S4 to continue the operation of the vehicle 100. On the other hand, if YES, i.e., if the battery 1 is subjected to the high-rate discharge, the flow goes to a temperature difference calculation sub-routine in step S20 mentioned later to calculate temperature rise amounts DTX, DTY, and DTZ generated in the positive-side laminated part 20LX, the negative-side laminated part 20LY, and the central laminated part 20LZ by the high-rate discharge.

The temperature difference calculation sub-routine in step S20 is explained with reference to FIG. 10.

In step S21, firstly, a positive-side preceding temperature TX1 of the positive-side laminated part 20LX immediately before the battery 1 is subjected to the high-rate discharge in step S7 is measured by the first thermocouple 50X. Similarly, a preceding temperature TY1 of the negative-side laminated part 20LY is measured by the second thermocouple 50Y and a preceding temperature TZ1 in the central laminated part 20LZ is measured by the third thermocouple 50Z immediately before the battery 1 is subjected to the high-rate discharge.

In step S22, thereafter, a positive-side post-discharge temperature TX2 in the positive-side laminated part 20LX is measured by the first thermocouple 50X after the termination of the high-rate discharge in step S7. Specifically, the temperature of the positive-side laminated part 20LX after 10 seconds from the start of high-rate discharge is measured.

Similarly, a negative-side post-discharge temperature TY2 in the negative-side laminated part 20LY is measured by the second thermocouple 50Y and a central post-discharge temperature TZ2 in the central laminated part 20LZ is measured by the third thermocouple 50Z.

In step S23, successively, based on the positive-side preceding temperature TX1 and the positive-side post-discharge temperature TX2, a positive-side rise amount DTX in the positive-side laminated part 20LX, which is caused by the high-rate discharge, is calculated (DTX=TX2−TX1). Similarly, a negative-side rise amount DTY in the negative-side laminated part 20LY, which is caused by the high-rate discharge, is calculated based on the negative-side preceding temperature TY1 and the negative-side post-discharge temperature TY2. A central rise amount DTZ in the central laminated part 20LZ, which is caused by the high-rate discharge, is calculated based on the central preceding temperature TZ1 and the central post-discharge temperature TZ2. After calculation, the temperature difference calculation sub-routine is terminated. The flow then returns to a main routine.

In step S8 of the main routine, it is judged whether a first rise amount difference F1 (=DTZ−DTX) is a negative value or a second rise amount difference F2 (=DTZ−DTY) is a negative value, in which F1 is a difference between the central rise amount DTZ and the positive-side rise amount DTX and F2 is a difference between the central rise amount DTZ and the negative-side rise amount DTY.

If NO in this step, that is, if the first rise amount difference F1 is zero or a positive value and the second rise amount difference F2 is zero or a positive value, the flow goes to step S9. This is because the high-rate deterioration of the battery 1 has not progressed yet.

On the other hand, if YES, that is, if the first rise amount difference F1 is a negative value or the second rise amount difference F2 is a negative value, the flow goes to step S11. This is conceivably because the high-rate deterioration of the battery 1 has progressed to some extent and thus further progression has to be prevented.

In step S9, successively, it is determined whether or not the discharge maximum current value has been limited to a lower one.

If NO in this step, i.e., if the discharge maximum current value has not been limited to a lower one, the flow directly returns to step S4. If YES, on the other hand, i.e., if the discharge maximum current value has been limited to a lower one, the flow advances to step S10 in which the limitation is removed and the flow returns to step S4.

In step S11, on the other hand, the discharge maximum current value of the discharge current DC flowing in the battery 1 is limited to a lower value. For instance, an upper limit value of the discharge current DC is changed from 10 C maximum to 7 C maximum. Then, the flow returns to step S4 to continue the operation of the vehicle 100. Consequently, in the next high-rate discharge, the discharge maximum current value of the discharge current DC is to be limited to a lower value.

The battery system M1 in Embodiment 1 includes the first thermocouple 50X, the second thermocouple 50Y, the third thermocouple 50Z, and the control unit 130. Accordingly, by using the temperatures of the positive-side laminated part 20LX, the negative-side laminated part 20LY, and the central laminated part 20LZ of the battery 1 (the positive-side preceding temperature TX1, the positive-side post-discharge temperature TX2, the negative-side preceding temperature TY1, the negative-side post-discharge temperature TY2, the central preceding temperature TZ1, and the central post-discharge temperature TZ2), it is possible to calculate the rise amount differences F1 and F2 and others of the temperature rise amounts DTX, DTY, and DTZ before and after the high-rate discharge in each of the parts. Thus, the battery 1 can be appropriately controlled based on the calculated results.

Furthermore, the battery system M1 uses the temperature in each part (the positive-side preceding temperature TX1, the positive-side post-discharge temperature TX2, the negative-side preceding temperature TY1, the negative-side post-discharge temperature TY2, the central preceding temperature TZ1, and the central post-discharge temperature TZ2). Accordingly, it is possible to more easily detect various non-uniformity (nonuniformity of lithium ion concentration)

occurring in the laminated part 20L for example than in the case where the lithium ion concentration of the electrolyte in each part is directly detected.

Furthermore, the control unit 130 includes limitation changing means S8 and S9. Based on the rise amount difference (the first rise amount difference F1 and the second rise amount difference F2) in the temperature rise amount (the positive-side rise amount DTX, the negative-side rise amount DTY, and the central rise amount DTZ) between the central laminated part 20LZ and the positive-side laminated part 20LX and between the central laminated part 20LZ and the negative-side laminated part 20LY, the limitation changing means S8 and S9 change the limitation so as to reduce the discharge current DC for high-rate discharge. Accordingly, it is possible to appropriately control the high-rate deterioration of the battery 1 caused by the high-rate discharge.

The limitation changing means S8 and S9 of the battery system M1 in Embodiment 1 change the control to relatively reduce the discharge current DC of the high-rate discharge subsequently flowing in the battery 1 (the control in step S9 to limit the discharge maximum value to a lower value), when the first rise amount difference F1 or the second rise amount difference F2 is negative, that is, when the central rise amount DTZ in the central laminated part 20LZ becomes smaller than the positive-side rise amount DTX in the positive-side laminated part 20LX or the negative-side rise amount DTY in the negative-side laminated part 20LY. This makes it possible to restrain the progression of high-rate deterioration of the battery 1, namely, the increase in internal resistance. The high-rate deterioration occurring in the battery 1 can also be restored.

The vehicle 100 in Embodiment 1 includes the aforementioned battery system M1. Therefore, by using each temperature in the central laminated part 20LZ, the positive-side laminated part 20LZ, or the negative-side laminated part 20LY (the positive-side preceding temperature TX1, the positive-side post-discharge temperature TX2, the negative-side preceding temperature TY1, the negative-side post-discharge temperature TY2, the central preceding temperature TZ1, and the central post-discharge temperature TZ2), it is possible to calculate for example the temperature rise amounts DTX, DTY, and DTZ before and after discharge in each part and also a difference (the first rise amount difference F1 and the second rise amount difference F2) therebetween. Based on this, the vehicle 100 can appropriately control the battery 1.

Modified Example 1

A vehicle 200 in Modified example 1 of the present invention will be explained referring to FIGS. 1-5 and 10-13.

Modified example 1 is identical to Embodiment 1 mentioned above excepting that a control changing means of a battery system changes the control to relatively increase the value of discharge current.

The following explanation is therefore given with a focus on differences from Embodiment 1. Like parts to those in Embodiment 1 are not explained or are briefly described. It is to be noted that identical or similar parts to those in Embodiment 1 provide the same operations and advantages as in Embodiment 1. The identical or similar parts are given with the same reference numbers as those in Embodiment 1 in the following explanation.

Figure 11:
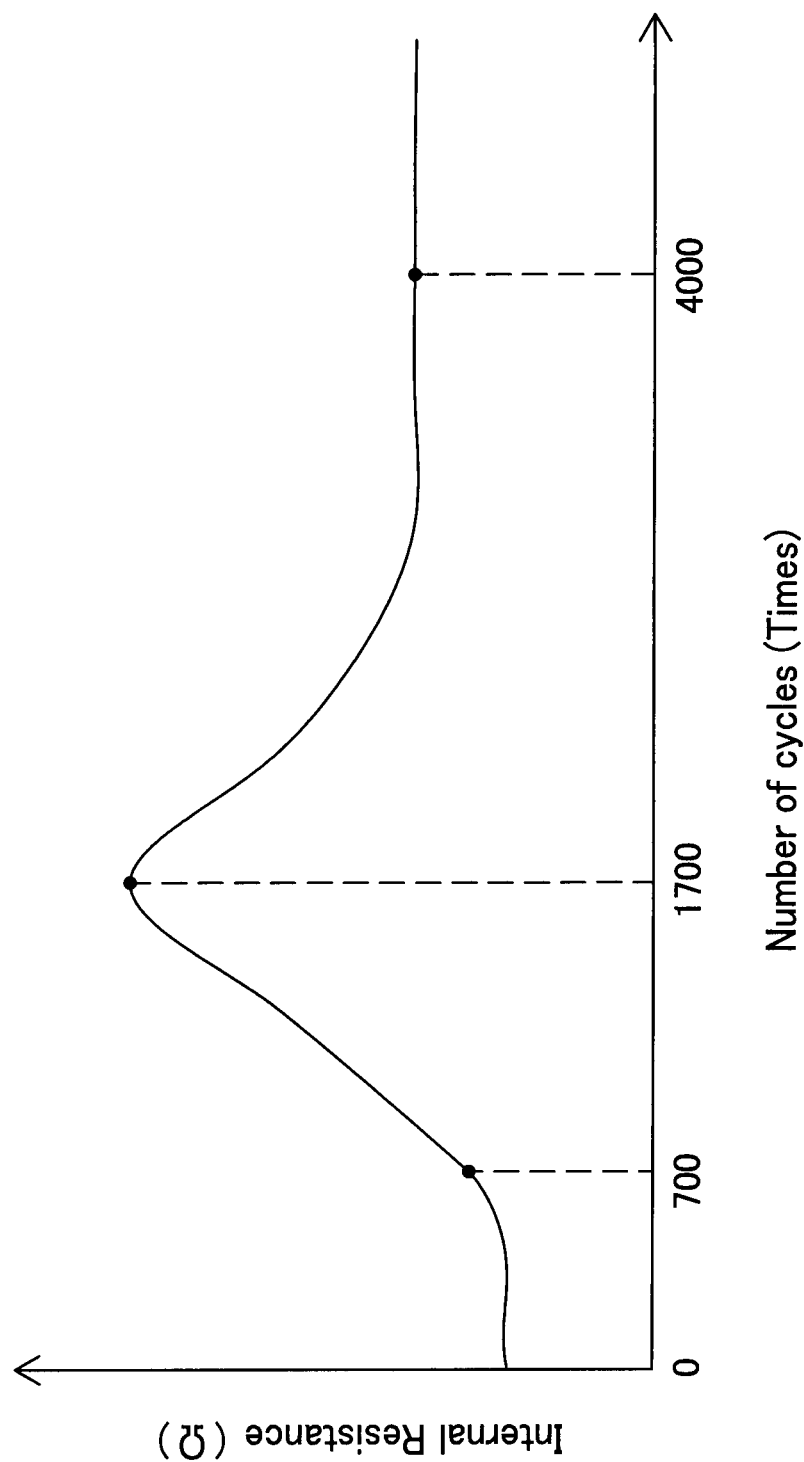
FIG. 11 is a graph showing a relationship between internal resistance of the lithium ion secondary battery and the number of cycles in the charge and discharge cycle test.

Meanwhile, the present inventors found that when the battery 1 was repeatedly subjected to the high-rate discharge more times than in Embodiment 1, the internal resistance of the battery 1 increased once, and then decreased and became constant (see FIG. 11).

This result reveals that when the high-rate deterioration of the battery 1 is forcibly progressed to pass through a high internal resistance state, the internal resistance then comes to a rather preferable state (with low internal resistance).

To check this, the internal resistance of the battery 1 was measured and the temperature of each of the positive-side laminated part 20LX, the negative-side laminated part 20LY, and the central laminated part 20LZ was measured before and after the high rate discharge at the test start time and at each of the number of cycles of 700, 1700, and 4000. Respective temperature rise amounts were calculated.

Figure 12:
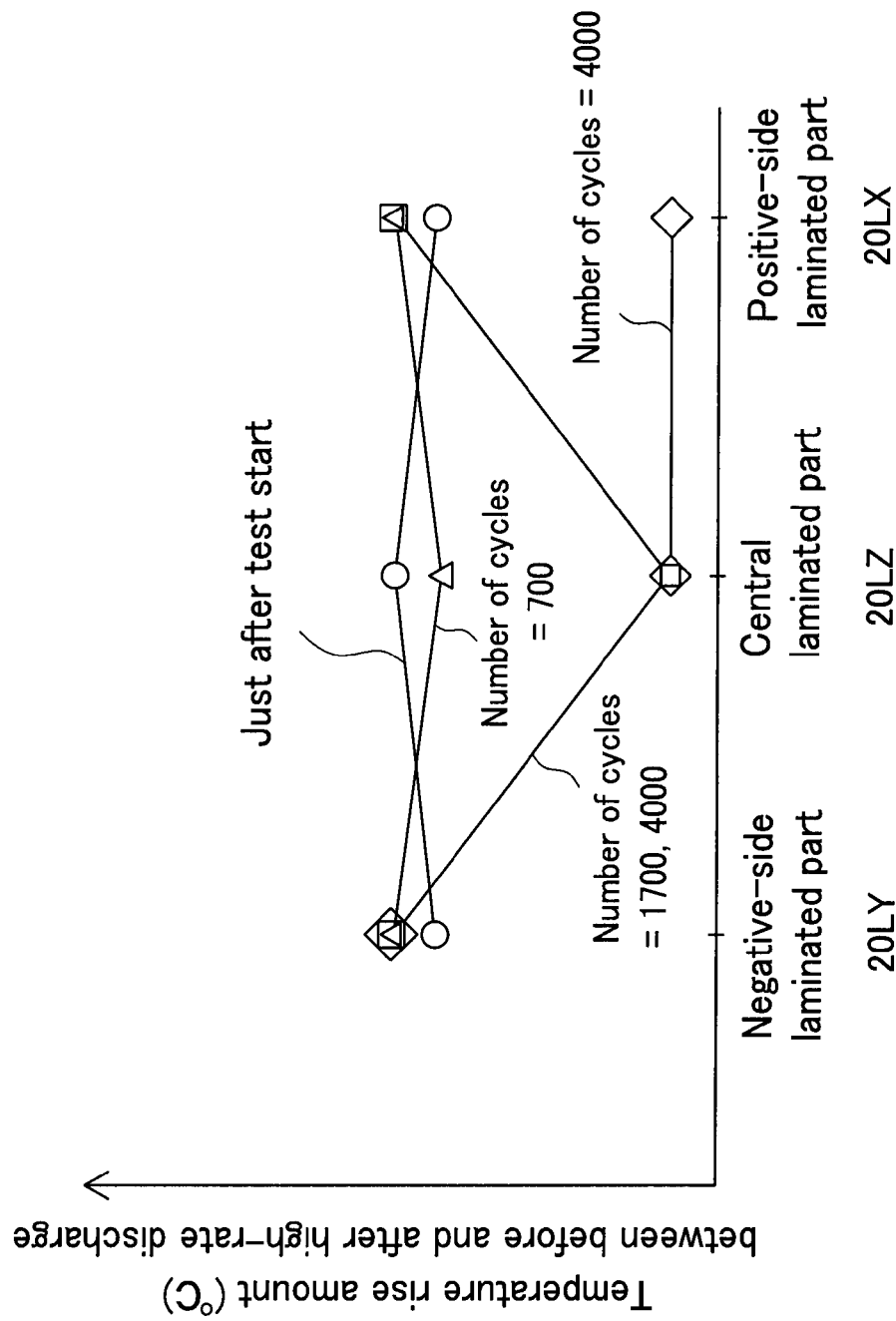
FIG. 12 is a graph showing lithium ion concentration in each laminated part of the lithium ion secondary battery.

Measurement results are shown in FIG. 12. According to this graph, at the number of cycles of 1700 at which the internal resistance is high, the temperature rise amount of the central laminated part 20LZ is smaller than the temperature rise amounts of the positive-side laminated part 20LX and the negative-side laminated part 20LY. On the other hand, at the number of cycles of 4000 at which the internal resistance is low, the temperature rise amount of the positive-side laminated part 20LX is also low. This reveals that the temperature rise amount of the central laminated part 20LZ is smaller than the temperature rise amount of the negative-side laminated part 20LY and almost equal to the temperature rise amount of the positive-side laminated part 20LX.

Based on the above experimental results, the control of the battery 1 in the battery system M2 in Modified example 1 will be explained in detail referring to flowcharts in FIGS. 13 and 10.

Figure 13:
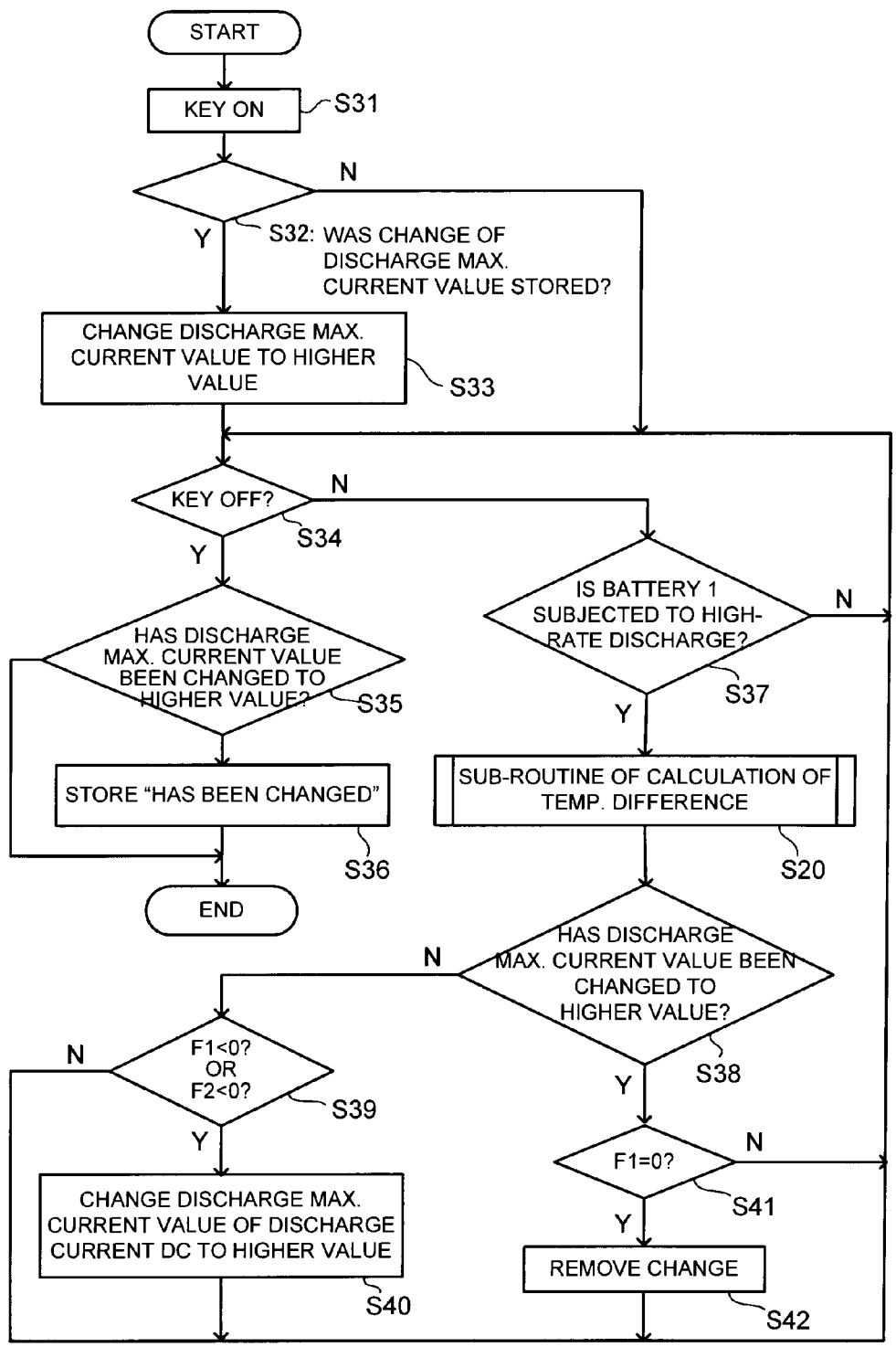
FIG. 13 is a flowchart in Modified example 1.

Firstly, when the vehicle 200 is started (Key ON) to operate (step S31), a control unit 130 of the vehicle 200 is activated (see FIG. 13). In S32, it is determined whether or not the control unit 130 stored at the preceding stop time of operation of the vehicle 200 that the control was changed the control to increase the discharge maximum current value allowed to flow from the battery 1. It is to be noted that "Changing the discharge maximum current value to a higher value" indicates changing a maximum value of discharge current DC allowed to flow in the battery 1 for discharge, to a higher value than before this changing.

If NO in this step, that is, if it was not stored that the discharge maximum current value was changed to a higher one, the flow advances step S34. On the other hand, if YES, that is, if it was stored that the discharge maximum current value was changed to a higher one, the flow advances to step S33 where the discharge maximum current value of the discharge current DC of the battery 1 is changed to a higher value during the present operation, and then the flow goes to step S34.

In step S34, successively, it is determined whether the stop of operation (Key OFF) of the vehicle 200 is instructed.

If NO in this step, that is, if the operation of the vehicle 200 is not stopped (not Key OFF), the flow advances to step S37. On the other hand, if YES, that is, if the operation of the vehicle 200 is stopped (Key OFF), the flow goes to step S35 in which it is determined whether or not the discharge maximum current value has been changed to a higher one at the present operation stop time.

If NO in this step, i.e., if the discharge maximum current value was not changed to a higher one at the present operation stop time, the operation is directly stopped. On the other hand, if YES, i.e., if the discharge maximum current value has been changed to a higher one at the present operation stop time, the flow goes to step S36 in which the control unit 130 stores that the discharge maximum current value has been changed to a higher one, and then the operation is terminated.

In step S37, on the other hand, it is determined whether or not the battery 1 is subjected to high-rate discharge.

If NO in this step, i.e., if the battery 1 is not subjected to the high-rate discharge, the flow returns to step S34 to continue the operation of the vehicle 200. If YES, on the other hand, that is, if the battery 1 is subjected to the high-rate discharge, the flow goes to a temperature difference calculating subroutine (see FIG. 10) in step S20 similar to that in Embodiment 1. Thus, the temperature rise amounts DTX, DTY, and DTZ of the positive-side laminated part 20LX, the negative-side laminated part 20LY, and the central laminated part 20LZ caused by the high-rate discharge are calculated. Herein, the explanation of the temperature difference calculating subroutine is not repeated.

In step S38, it is determined whether or not the discharge maximum current value has been changed to a higher one.

If NO in this step, i.e., if the discharge maximum current value has not been changed to a higher one, the flow goes to step S39. On the other hand, if YES, i.e., if the discharge maximum current value has been changed to a higher one, the flow goes to step S41.

In step S39, it is determined whether or not a first rise amount difference F1 (=DTZ−DTX) that is a difference between the central rise amount DTZ and the positive-side rise amount DTX is a negative value or a second rise amount difference F2 (=DTZ−DTY) that is a difference between the central rise amount DTZ and the negative-side rise amount DTY is a negative value.

If NO in this step, i.e., if the first rise amount difference F1 is zero or a positive value and the second rise amount difference F2 is zero or a positive value, the flow returns to step S34.

On the other hand, if YES, i.e., if the first rise amount difference F1 is a negative value or the second rise amount difference F2 is a negative value, the flow goes to step S40. The high-rate deterioration of the battery 1 is assumed to have progressed. Thus, the discharge maximum current value is changed to a higher value to prompt this high-rate deterioration.

In step S40, the discharge maximum current value of the discharge current DC flowing in the battery 1 is changed to a higher value. For instance, an upper limit of the discharge current DC is changed from 10 C maximum to 13 C maximum. Then, the flow returns to step S34 to continue the operation of the vehicle 200.

On the other hand, in step S41, it is determined whether or not the first rise amount difference F1 is zero, i.e., DTZ=DTX.

If NO in this step, that is, if the first rise amount difference F1 is not zero, i.e., DTZ≠DTX, the flow directly returns to step S34. If YES, on the other hand, that is, if the first rise amount difference F1 is zero, i.e., DTZ=DTX, the flow goes to step S42 where the change is removed, and then the flow returns to step S34.

As above, the control changing means S39 and S40 of the battery system M2 of the vehicle 200 in Modified example 1 change the control to increase the subsequent discharge current DC of the high-rate discharge flowing in the battery 1 (the control to limit the discharge maximum current value to a higher value in step S40) when the first rise amount difference F1 or the second rise amount difference F2 is negative, that is, the central rise amount DTZ is smaller than the positive-side rise amount DTX or the negative-side rise amount DTY. This makes it possible to make the battery 1 quickly go through a high internal resistance state to enable the use of the battery 1 in a low internal resistance state.

Embodiment 2

A vehicle 300 in Embodiment 2 of the present invention will be explained referring to FIGS. 1 and 14-16.

Embodiment 2 is different from Embodiment 1 in that a battery further includes a central temperature changing means, a positive-side temperature changing means, and a negative-side temperature changing means, and they are controlled by a control means.

Figure 14:
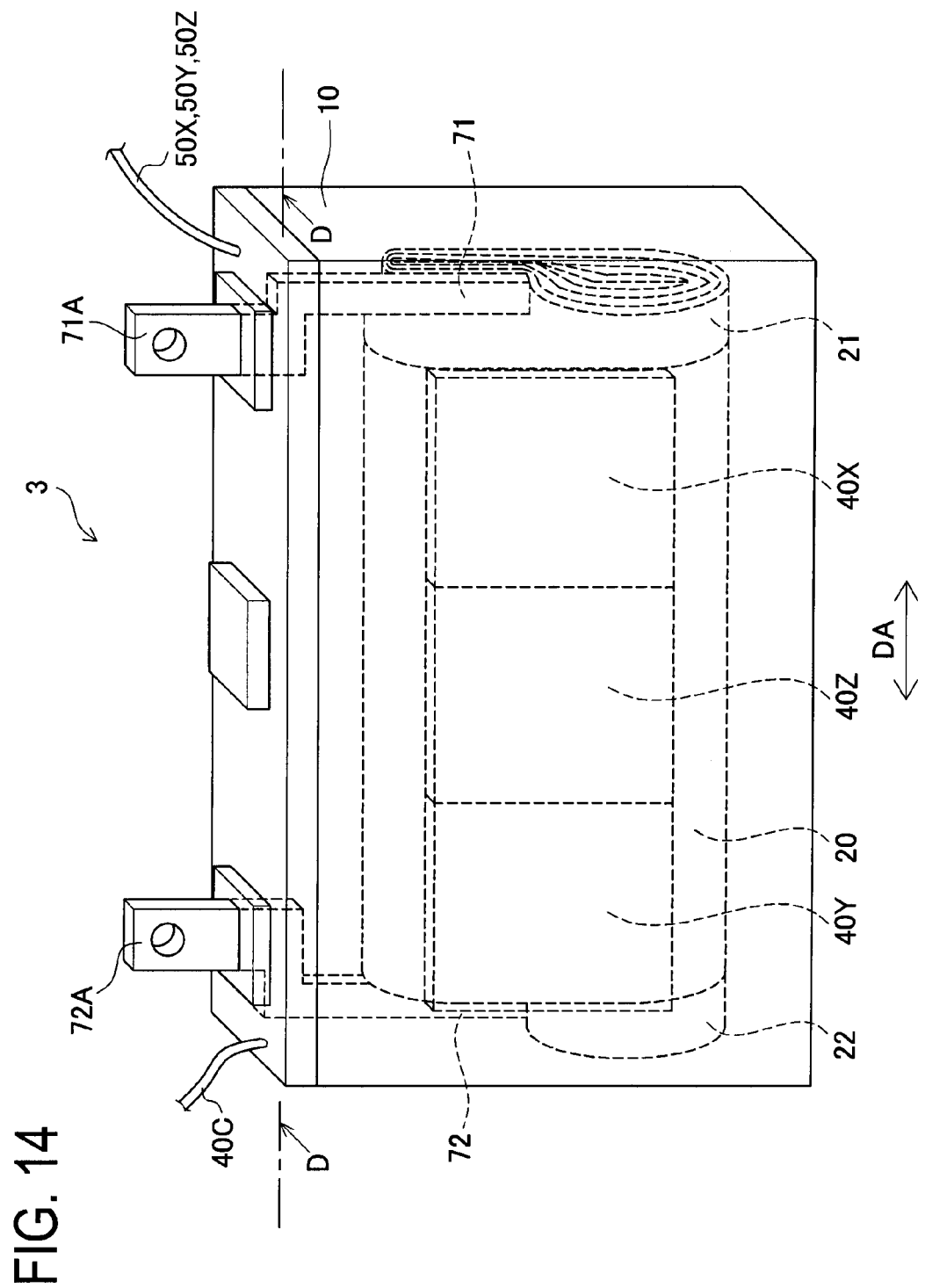
FIG. 14 is a perspective view of a lithium ion secondary battery in Embodiment 2.
Figure 15:
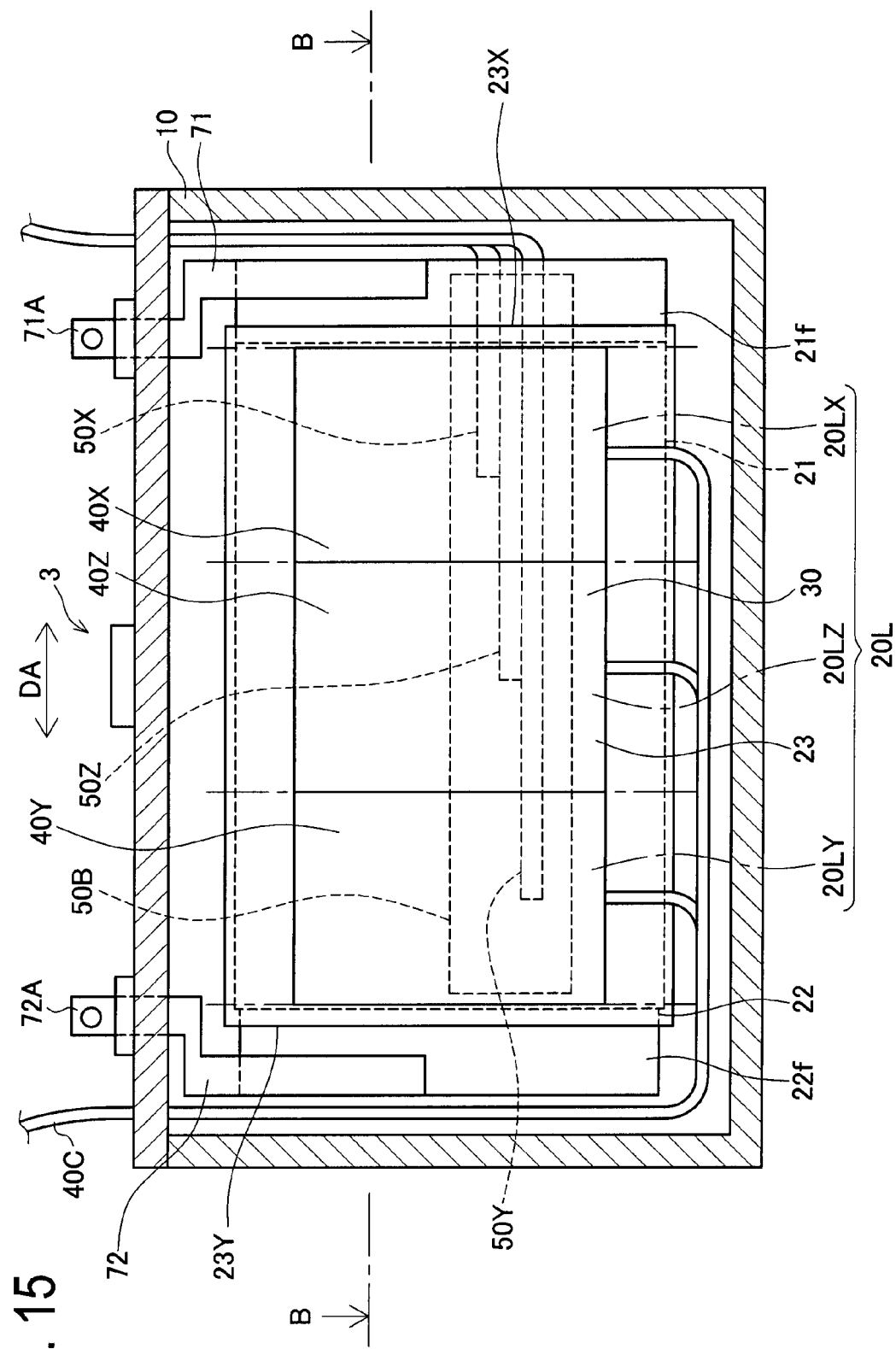
FIG. 15 is a cross-sectional view of the lithium ion secondary battery in Embodiment 2 (a cross-sectional view along D-D in FIG. 14)

Specifically, a battery 3 in Embodiment 2 is identical in structure to the battery 1 in Embodiment 1 mentioned above and further includes three rectangular plate-like Peltier elements (a first element 40X, a second element 40Y, and a third element 40Z) arranged in front of a power generating element 20 in FIG. 14 in a battery case 10 as shown in FIGS. 14 and 15. The first element 40X is fixedly placed in contact with a positive-side laminated part 20LX, the second element 40Y is fixedly placed in contact with a negative-side laminated part 20LY, and the third element 40Z is fixedly placed in contact with a central laminated part 20LZ, respectively. Those first, second, and third elements 40X, 40Y, and 40Z are connected to a control unit 130 through a cable 40C, so that they are energized and controlled. Accordingly, the elements 40X, 40Y, and 40Z are controlled by the control unit 130 to absorb heat from each of the laminated parts 20LX, 20LY, and 20LZ of the power generating element 20 to cool them.

A battery system M3 in the discharge embodiment includes batteries 3, thermocouples 50X, 50Y, and 50Z, the Peltier elements 40X, 40Y, and 40Z, and the control unit 130.

Figure 16:
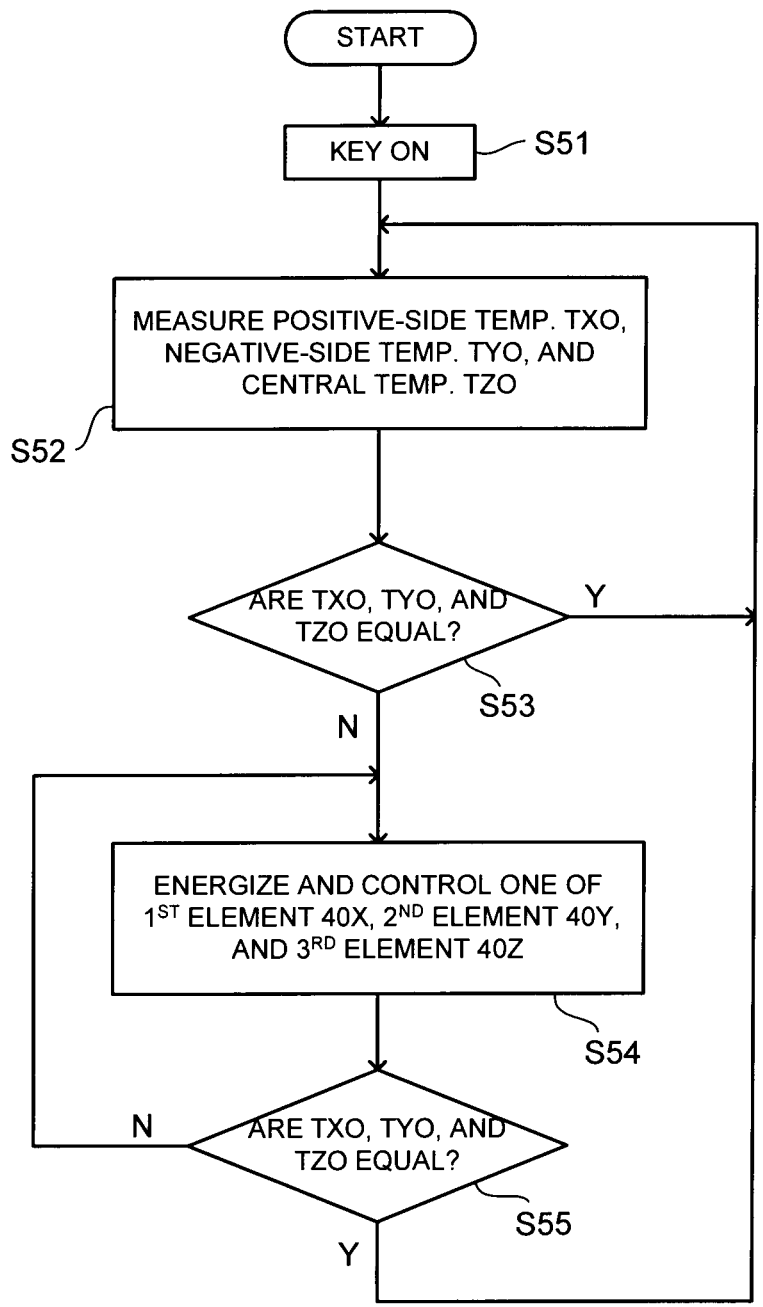
FIG. 16 is a flowchart in Embodiment 2.

The control of the battery 3 in the battery system M3 will be described in detail referring to a flowchart in FIG. 16.

Firstly, the vehicle 300 is started (Key ON) to operate (step S51), the control unit 130 of the vehicle 300 is activated. In S52, by use of the first thermocouple 50X, the second thermocouple 50Y, and the third thermocouple 50Z, a positive-side temperature TX0, a negative-side temperature TY0, and a central temperature TZ0 of the laminated part 20L of each battery 3 are measured. This measurement is performed at regular intervals by use of a built-in timer (not shown) in the control unit 130.

In step S53, it is determined whether or not the positive-side temperature TX0, the negative-side temperature TY0, and the central temperature TZ0 are equal or uniform (TX0=TY0=TZ0).

If YES in this step, the flow returns to step S52 to wait a next measurement timing. On the other hand, if NO, that is, if the positive-side temperature TX0, the negative-side temperature TY0, and the central temperature TZ0 are unequal or nonuniform (e.g., TX0=TY0<TZ0), the flow goes to step S54.

In step S54, any one of the Peltier elements (the first element 40X, the second element 40Y, the third element 40Z) fixedly placed in the laminated part 20L is energized and controlled in order to cool any one of the positive-side laminated part 20LX, the negative-side laminated part 20LY, and the central laminated part 20LZ. For instance, if TX0=TY0<TZ0, the third element 40Z is energized and controlled to cool the central laminated part 20LZ higher in temperature than others so that the central temperature TZ0 becomes equal to other temperatures (the positive-side temperature TX0 and the negative-side temperature TY0).

After cooling, it is determined in step S55 whether or not the positive-side temperature TX0, the negative-side temperature TY0, and the central temperature TZ0 are equal.

If NO in this step, that is, if the positive-side temperature TX0, the negative-side temperature TY0, and the central temperature TZ0 are not equal, the flow returns to step S54 where the Peltier elements (the first element 40X, the second element 40Y, the third element 40Z) are continuously energized and controlled so that the positive-side temperature TX0, the negative-side temperature TY0, and the central temperature TZ0 become equal. On the other hand, if YES, that is, the positive-side temperature TX0, the negative-side temperature TY0, and the central temperature TZ0 are equal to each other, the flow returns to step S52.

The battery system M3 of the vehicle 300 in Embodiment 2 includes the aforementioned Peltier elements (the first element 40X, the second element 40Y, the third element 40Z) and the control unit 130 includes the temperature control means S54. Accordingly, it is possible to appropriately change the temperatures (TZ0, TX0, TY0) of the central laminated part 20LZ, the positive-side laminated part 20LX, and the negative-side laminated part 20LY based on measurement results of the central temperature TZ0 of the central laminated part 20LZ, the positive-side temperature TX0 of the positive-side laminated part 20LX, and the negative-side temperature TY0 of the negative-side laminated part 20LY of the power generating element 20. This enables appropriate temperature control by controlling the temperature to eliminate nonuniformity of lithium ion concentration and others occurring in the laminated part 20L.

Embodiment 3

Figure 17:
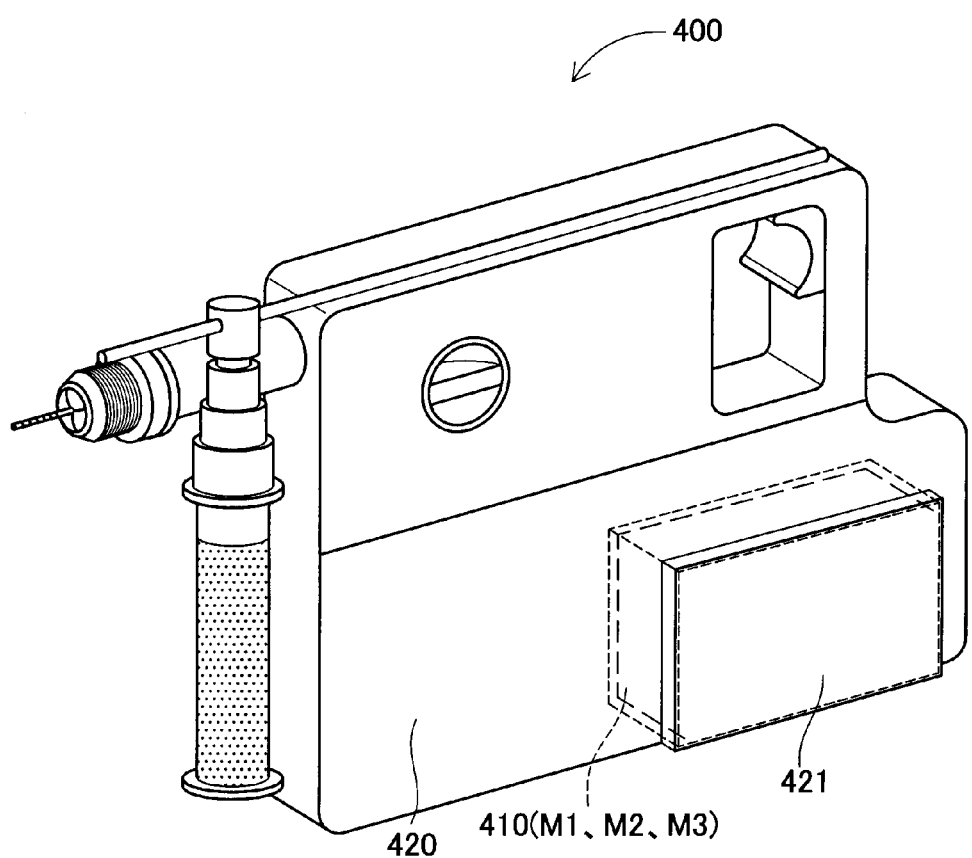
FIG. 17 is a perspective view of a hammer drill in a Embodiment 3.

A hammer drill 400 in Embodiment 3 mounts a battery pack 410 containing one of the aforementioned battery systems M1, M2, and M3. The hammer drill 400 is a battery mounting device having the battery pack 410 and a main body 420 as shown in FIG. 17. The battery pack 410 is removably housed in a pack housing part 421 of the main body 420 of the hammer drill 400.

The hammer drill 400 in Embodiment 3 includes the aforementioned battery system M1, M2, or M3. Accordingly, the hammer drill 400 is able to calculate a difference between the temperatures TX0, TY0, and TZ0 of the parts, the temperature rise amounts DTX, DTY, and DTZ of the parts before and after discharge and a difference (a first rise amount difference F1, a second rise amount difference F2) therebetween by use of the temperatures of the central laminated part 20LZ, the positive-side laminated part 20LX, and the negative-side laminated part 20LY (a positive-side temperature TX0, a negative-side temperature TY0, a central temperature TZ0, a positive-side preceding temperature TX1, a positive-side post-discharge temperature TX2, a negative-side preceding temperature TY1, a negative-side post-discharge temperature TY2, a central preceding temperature TZ1, and a central post-discharge temperature TZ2), and appropriately control the batteries 1 and 3 by use of a calculation result.

The present invention is explained in Embodiment 1, Embodiment 2, Embodiment 3, and Modified example 1 but the present invention is not limited thereto. The present invention may be embodied in other specific forms without departing from the essential characteristics thereof.

For instance, in Embodiment 1, the first thermocouple, the second thermocouple, and the third thermocouple are inserted in the position of the axial core of the power generating element to detect the temperatures of the positive-side laminated part, the negative-side laminated part, and the central laminated part. An alternative is to place the first thermocouple, the second thermocouple, and the third thermocouple on the outer surface(s) of the power generating element or between layers of the laminated parts of the power generating element to detect the temperatures of the positive-side laminated part, the negative-side laminated part, and the central laminated part.

In Embodiment 2, the central temperature TZ0, the positive-side temperature TX0, and the negative-side temperature TY0 of the power generating element 20 are controlled to be equal to eliminate nonuniformity of lithium ion concentration. Reversely, for example, they may be controlled to produce a temperature difference between the central temperature TZ0 and the positive-side temperature TX0 and the negative-side temperature TY0 in order to prompt the high-rate deterioration of the battery. The Peltier elements that absorb heat when energized are used as the central temperature changing means, the positive-side temperature changing means, and the negative-side temperature changing means. As an alternative, a heater that generates heat when energized may be used.

The invention claimed is:

1. A battery system comprising:
a lithium ion secondary battery having a power generating element including
a positive electrode plate,
a negative electrode plate, and
a separator,
the power generating element including
a laminated part in which the positive electrode plate and the negative electrode plate are laminated by interposing the separator therebetween,
a positive extended part formed of a part of the positive electrode plate extending from the laminated part, and
a negative extended part formed of a part of the negative electrode plate extending from the laminated part in an opposite direction to the positive extended part;
control means for controlling the lithium ion secondary battery;
wherein a positive and negative extending direction is defined as a direction joining the positive extended part and the negative extended part, and
wherein the laminated part is divided in the positive and negative extending direction into three sections of: a central laminated part, a positive-side laminated part, and a negative-side laminated part,
central temperature detecting means for detecting a temperature of the central laminated part located in the center of the laminated part in the positive and negative extending direction; and
at least one of:
positive-side temperature detecting means for detecting a temperature of the positive-side laminated part of the laminated part, the positive-side laminated part being located closer to the positive extended part in the positive and negative extending direction than the central laminated part is, and
negative-side temperature detecting means for detecting a temperature of the negative-side laminated part of the laminated part, the negative-side laminated part being located closer to the negative extended part in the positive and negative extending direction than the central laminated part is,
the control means being arranged to control the lithium ion secondary battery by use of the temperature of the central laminated part and at least one of the temperature of the positive-side laminated part, and the temperature of the negative-side laminated part.

2. The battery system according to claim 1, wherein
the control means includes limitation changing means for changing limitation of charge and discharge current to be allowed to flow in the lithium ion secondary battery during high-rate charge and discharge based on a rise amount difference between a temperature rise amount of the temperature rise in the central laminated part and at least one of a temperature rise amount of the temperature rise in the positive-side laminated part and a temperature rise amount of the temperature rise in the negative-side laminated part, the difference being generated by the high-rate discharge.

3. The battery system according to claim 2, wherein
the limitation changing means changes the control to relatively decrease a discharge current of subsequent high-rate discharge when the temperature rise amount of the central laminated part is smaller than one of the temperature rise amount of the positive-side laminated part and the temperature rise amount of the negative-side laminated part.

4. The battery system according to claim 2, wherein
the battery system includes the negative-side temperature detecting means, and
the limitation changing means changes the control to relatively increase a discharge current of subsequent high-rate discharge when the temperature rise amount of the central laminated part is smaller than the temperature rise amount of the negative-side laminated part.

5. The battery system according to claim 1, including:
central temperature changing means for changing a temperature of the central laminated part of the power generating element;
positive-side temperature changing means for changing a temperature of the positive-side laminated part of the power generating element; and
negative-side temperature changing means for changing a temperature of the negative-side laminated part of the power generating element,
wherein the control means includes temperature control means for controlling the central temperature changing means, the positive-side temperature changing means, and the negative-side temperature changing means.

6. A vehicle including a battery system set forth in claim 1.

7. A battery-mounting device including a battery system set forth in claim 1.

* * * * *